US011244252B2

(12) United States Patent
Li

(10) Patent No.: US 11,244,252 B2
(45) Date of Patent: Feb. 8, 2022

(54) AUTONOMOUS DRIVING UNDER USER INSTRUCTIONS AND HAILING METHODS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 422 days.

(21) Appl. No.: 15/629,690

(22) Filed: Jun. 21, 2017

(65) Prior Publication Data

US 2018/0374002 A1 Dec. 27, 2018

(51) Int. Cl.
| | |
|---|---|
| *G06Q 10/02* | (2012.01) |
| *G05D 1/00* | (2006.01) |
| *G06Q 50/30* | (2012.01) |
| *G06F 3/01* | (2006.01) |
| *G06F 3/0481* | (2013.01) |
| *G06F 3/0484* | (2013.01) |

(52) U.S. Cl.
CPC ........... *G06Q 10/02* (2013.01); *G05D 1/0088* (2013.01); *G06F 3/017* (2013.01); *G06Q 50/30* (2013.01); *G06F 3/04817* (2013.01); *G06F 3/04842* (2013.01)

(58) Field of Classification Search
CPC ...... G06Q 10/02; G06Q 50/30; G05D 1/0088; G06F 3/017; G06F 3/04817; G06F 3/04842
USPC .......................................................... 705/5
See application file for complete search history.

(56) References Cited

U.S. PATENT DOCUMENTS

| | | | | |
|---|---|---|---|---|
| 2004/0260470 A1* | 12/2004 | Rast | ..................... | G06Q 10/083 701/300 |
| 2011/0099040 A1* | 4/2011 | Felt | ........................ | G06Q 50/30 705/7.12 |
| 2011/0313880 A1* | 12/2011 | Paul | ....................... | G06Q 10/08 705/26.7 |
| 2014/0039784 A1* | 2/2014 | Millspaugh | ............ | G08G 1/202 701/300 |
| 2015/0081362 A1* | 3/2015 | Chadwick | ........ | G06Q 10/06311 705/7.14 |
| 2015/0206267 A1* | 7/2015 | Khanna | .................. | G06Q 50/30 705/5 |
| 2015/0339923 A1* | 11/2015 | Konig | ..................... | H04L 67/12 701/522 |
| 2016/0267618 A1* | 9/2016 | Baek | ....................... | G06Q 50/32 |
| 2017/0059347 A1* | 3/2017 | Flier | ............... | G06Q 10/08355 |
| 2017/0127215 A1* | 5/2017 | Khan | ..................... | H04W 4/021 |
| 2017/0356749 A1* | 12/2017 | Shelby | ............... | G01C 21/3407 |
| 2018/0189918 A1* | 7/2018 | Lu | ............................ | G06F 3/048 |
| 2019/0186930 A1* | 6/2019 | Chen | ..................... | G07C 5/008 |

OTHER PUBLICATIONS

A Hotspot Aware Taxi Zone Queuing System Published by Department of Information Engineering and Computer Science Feng Chia University in 2015 (Year: 2015).*

* cited by examiner

*Primary Examiner* — Zeina Elchanti

(57) ABSTRACT

System and method for implementing a user's commands to utilize and control an autonomous vehicle. In several aspects, certain rules are arranged for navigation and operation of autonomous vehicle. In one aspect, a vehicle is configured to show a message to a user who hails the vehicle with gestures. In another aspect, a one-tap hailing process is configured, wherein destination info is not required.

20 Claims, 16 Drawing Sheets

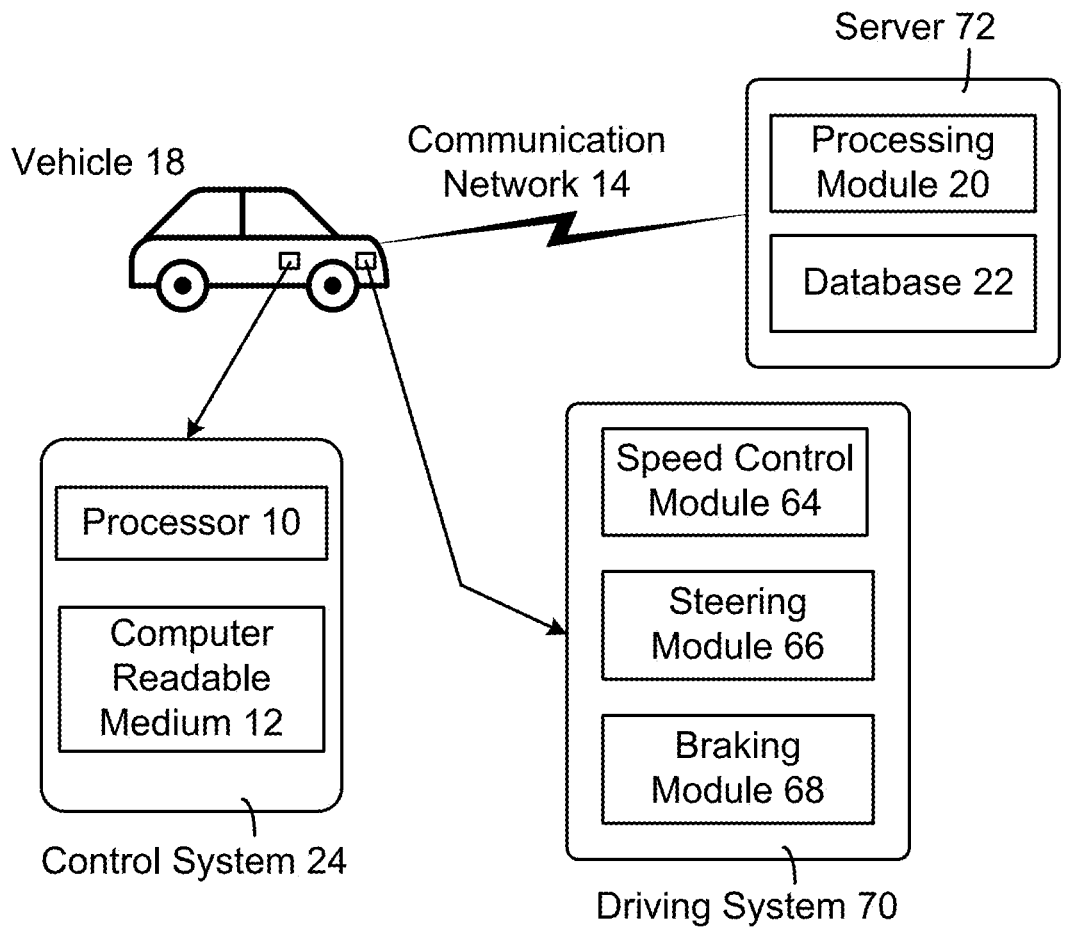
FIG. 1-A
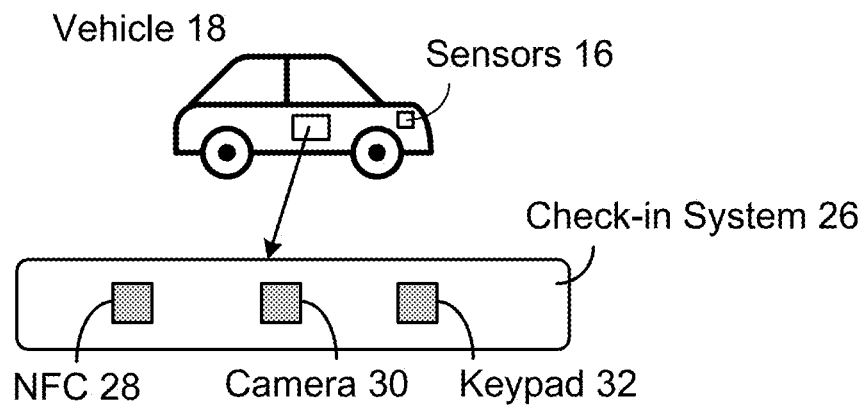
FIG. 1-B

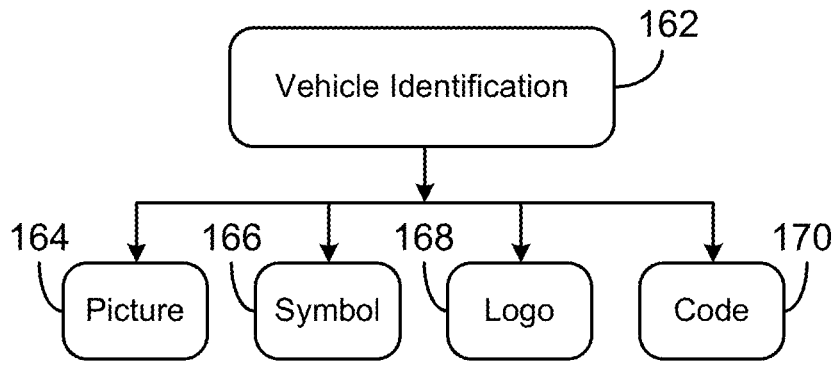
FIG. 5
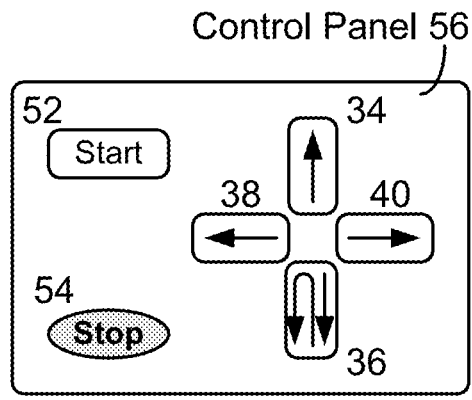
FIG. 6-A
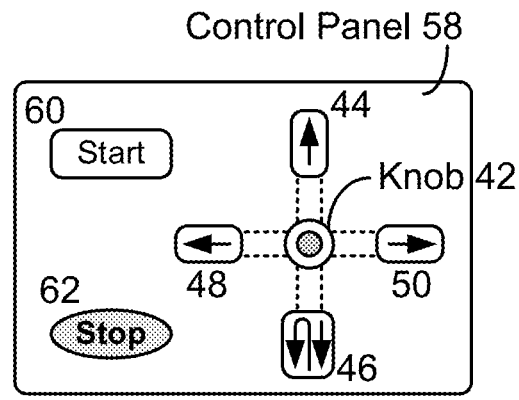
FIG. 6-B
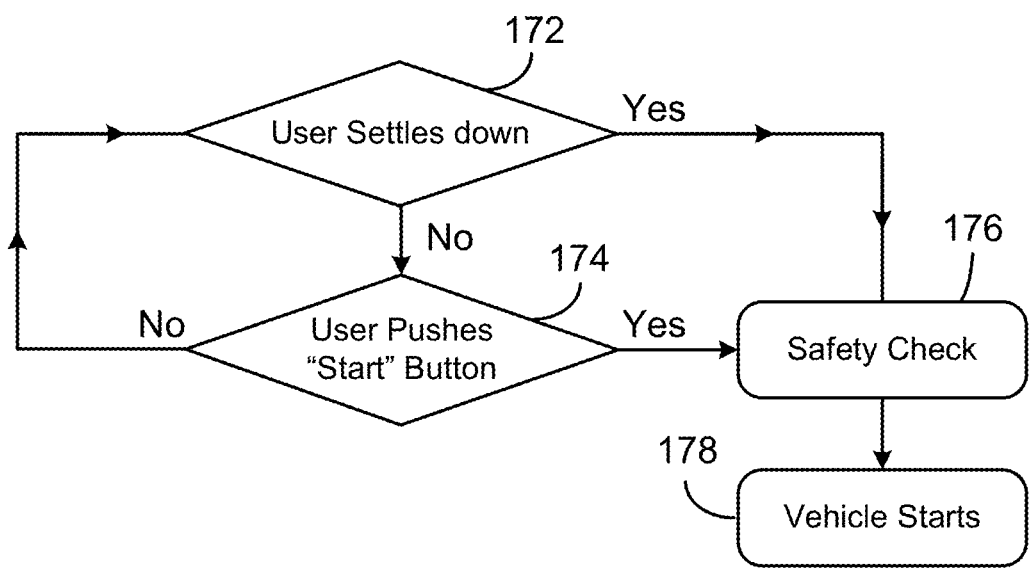
FIG. 7

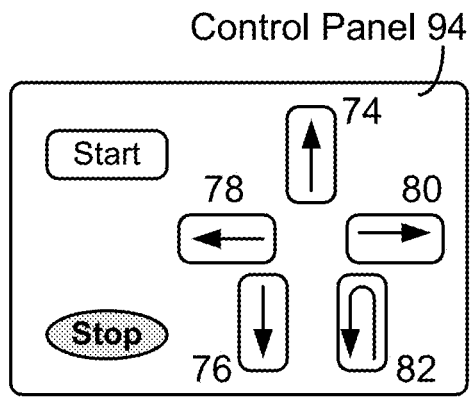
FIG. 24-A
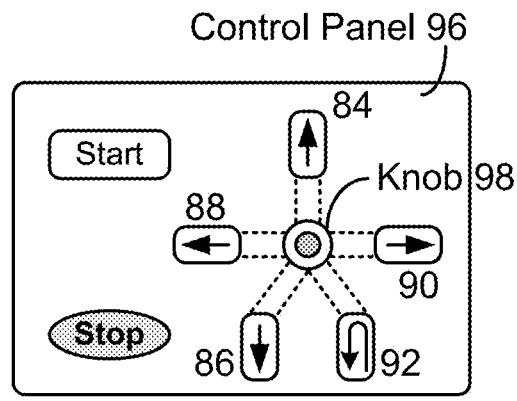
FIG. 24-B
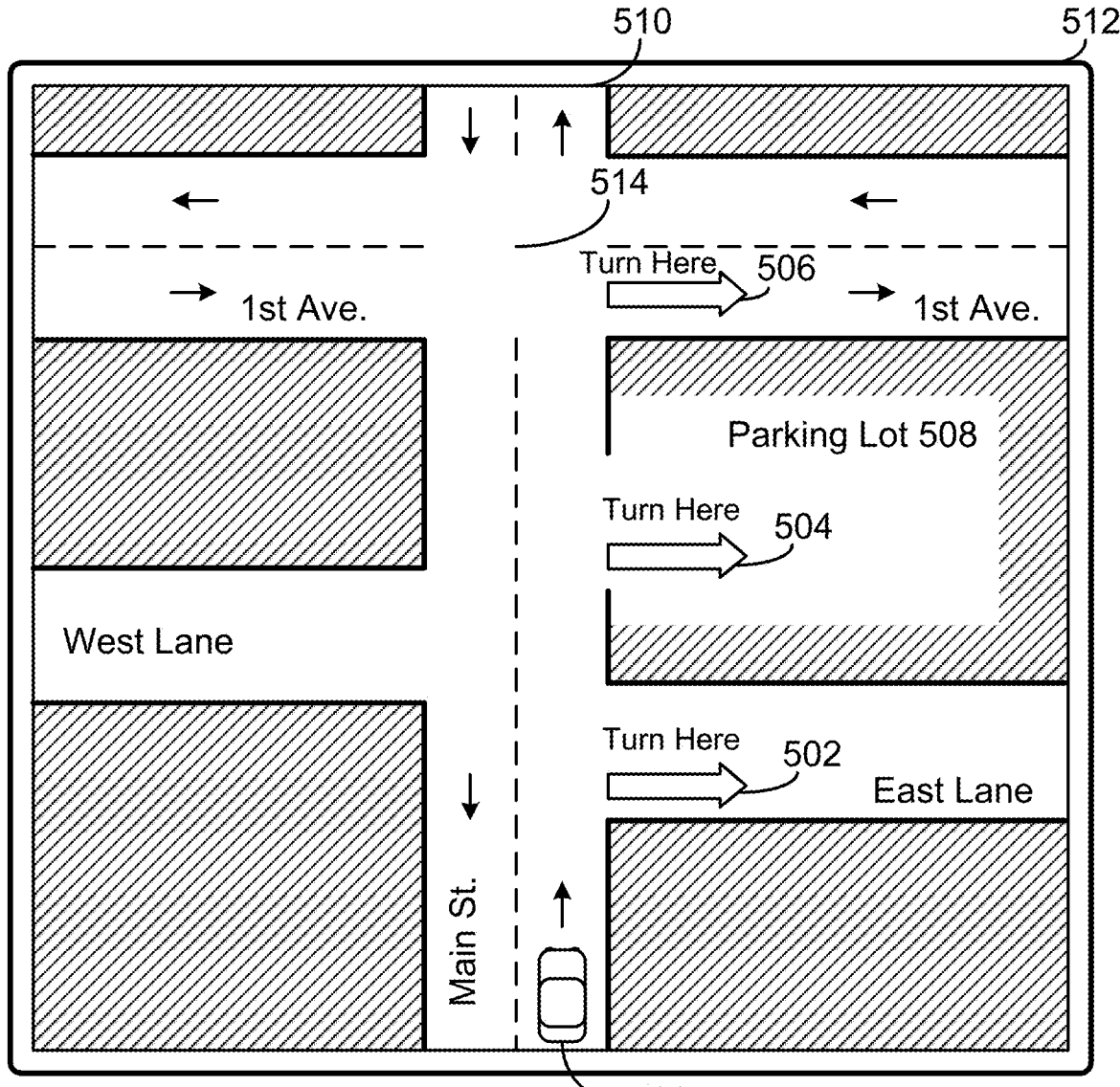
FIG. 25

AUTONOMOUS DRIVING UNDER USER INSTRUCTIONS AND HAILING METHODS

FEDERALLY SPONSORED RESEARCH

Not applicable

SEQUENCE LISTING OR PROGRAM

Not applicable

BACKGROUND

Field of Invention

This invention relates to autonomous driving, more particularly to autonomous driving under instructions from a user. This invention also relates to hailing a vehicle.

Description of Prior Art

Autonomous vehicles represent a great advance in the transportation industry. Autonomous driving is expected to reduce traffic fatalities and crashes caused by driver error, provide increased mobility for people who lack access to automobiles, reduce energy consumption and pollution, and cut costs associated with congestion. In general, an autonomous vehicle (also known as a driverless or self-driving vehicle) is a vehicle capable of sensing and navigating around the vehicle's surroundings and travelling autonomously to a destination without user input. The vehicle may employ a combination of sensors such as cameras, radar, light detection and ranging (LIDAR) system, global position system (GPS), etc. Data obtained from the sensors may be used to detect what's around it and road conditions. For instance, surrounding vehicles, traffic lanes, road markers, road signs, obstacles, and pedestrians may be identified. A vehicle control system may analyze the data to determine certain aspects of the vehicle operation, such as a target trajectory, steering, speed, signaling, braking, and so on. As consecutive maneuvers are calculated and implemented by the control system, the vehicle navigates to a destination through the driving environment autonomously.

When an autonomous vehicle is available, a user may just need to submit a destination to go to a place. Riding on a vehicle may become a simple and easy experience for all users. In some cases, however, a user may want to take a detour during a trip. The user may be unfamiliar with automobile driving and thus may not be able to maneuver a vehicle even when an option of manual driving is provided. Thus the user may have to change a destination temporarily and then switch back to it after a detour is completed. The method is unnatural, indirect, and inconvenient.

Therefore, there exists a need for a user to navigate an autonomous vehicle easily and intuitively.

When a user puts up a hand to hail a taxi on a street, the taxi may stop and pick up the person if it is vacant. If the taxi it is occupied or off-duty, it may continue driving without interacting with the user. In the latter case, the user may get anxious as there is no info on when another taxi may come. Such confusion may persist when taxies become driverless.

Therefore, there exists a need to respond to a user who gestures to hail a vehicle.

Currently when a user opens an app to schedule a taxi pickup, destination info has to be entered. A service company may need destination info to estimate fees and dispatch an appropriate driver. But sometimes a user may be uncertain about where to go and consequently find it impossible to reserve a vehicle. Hence, requirement of destination may cause inconvenience.

Therefore, there exists a need to arrange a vehicle pickup without destination info.

As used herein, word "vehicle" may mean any form of motorized transportation. Examples of vehicle may include automobile, drone, flying car, aircraft, and ship. Words "route", "road", "roadway", and "path" may have similar meanings and they may all mean a thoroughfare or open way between two places for vehicle travel or transportation. For convenience of description, it may be arranged that "Service Center" as used herein may mean a center as a business entity or a server which is operated at Service Center. "Check in" as used herein may mean a user logs in a user account at a vehicle using info obtained from a reservation or using other suitable info. After a check-in process, a user may be allowed to interact with a vehicle further. "Autonomous mode" as used herein may mean a driverless driving state. When a vehicle is in autonomous mode, it navigates and travels by itself without the need of user input.

OBJECTS AND ADVANTAGES

Accordingly, several main objects and advantages of the present invention are:

a). to provide an improved system and method for a user to utilize and hail an autonomous vehicle;

b). to provide such a system and method which are simple, convenient, and intuitive;

c). to provide such a system and method which make it easy and intuitive to maneuver a vehicle;

d). to provide such a system and method which arrange a vehicle to respond to a user who hails the vehicle with gestures; and e). to provide such a system and method which arrange a one-tap process to book a vehicle via an app without requirement of destination info.

Further objects and advantages will become apparent from a consideration of the drawings and ensuing description.

SUMMARY

In accordance with the present invention, a user may utilize and hail an autonomous vehicle with ease and convenience. Either four or five intuitive navigational commands are arranged. The four intuitive navigational commands comprise forward, backward/U-turn, turn left, and turn right options, wherein the backward/U-turn option leads to backward or U-turn command depending on road conditions and arrangement. The five intuitive navigational commands comprise forward, backward, turn left, turn right, and U-turn options. After implementing a maneuver required by a command from a user, a vehicle is arranged to go straight through one or more intersections within a given distance. In addition, methods are introduced to change a travel route, pay fees, monitor items left behind in a vehicle, generate an enhanced map, predetermine vehicle orientation direction, etc. Moreover, a vehicle is configured to respond to a user who hails it with gestures. A one-tap process is arranged for reserving a vehicle without entering destination info.

DRAWING FIGURES

FIGS. 1-A and 1-B are exemplary block diagrams describing an embodiment involving an autonomous vehicle and a server in accordance with the present invention.

FIG. 5 is an exemplary illustration to depict methods of vehicle identification in accordance with the present invention.

FIGS. 6-A and 6-B are exemplary diagrams describing control panel configurations in accordance with the present invention.

FIG. 7 is an exemplary flow diagram illustrating an embodiment in accordance with the present invention.

FIGS. 8, 9, 10 and 11 are exemplary flow diagrams illustrating vehicle operational processes in accordance with the present invention.

FIGS. 12, 13, 14, and 15 are exemplary flow diagrams illustrating vehicle operational processes after certain instructions are entered by a user in accordance with the present invention.

Figure 16:
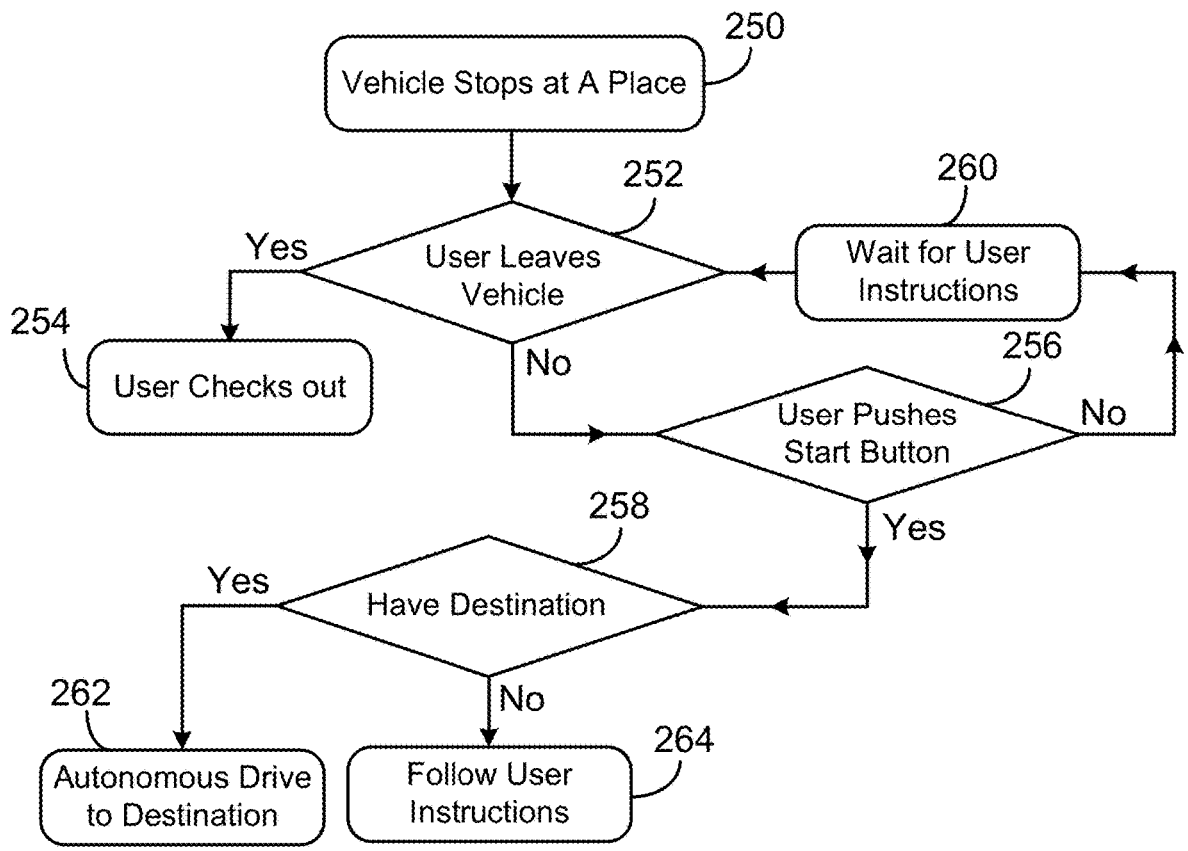
Figure 17:
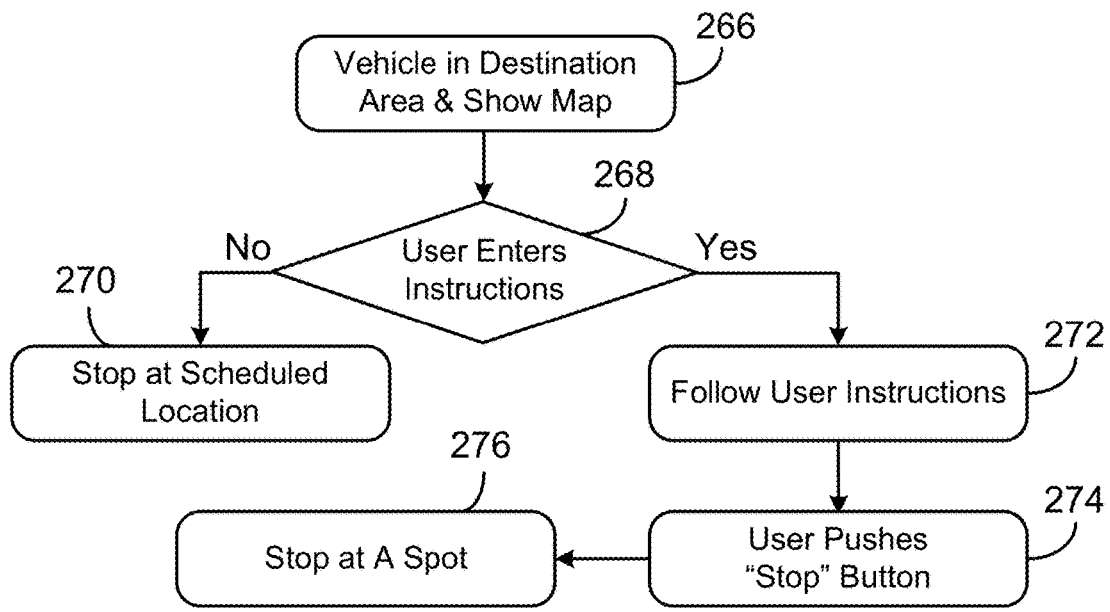
Figure 18:
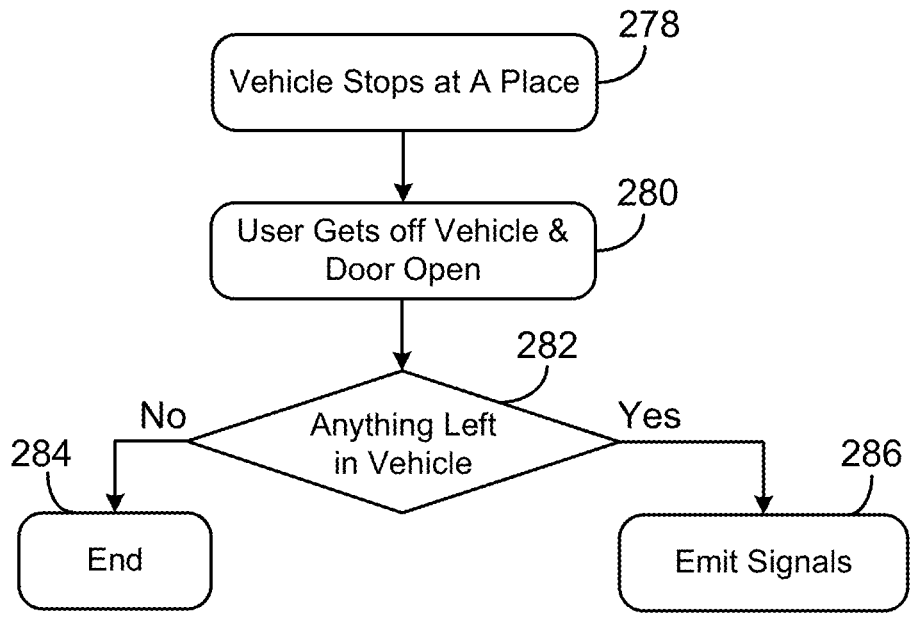

FIGS. 16, 17, and 18 are exemplary flow diagrams illustrating vehicle operational processes in accordance with the present invention.

Figure 19:
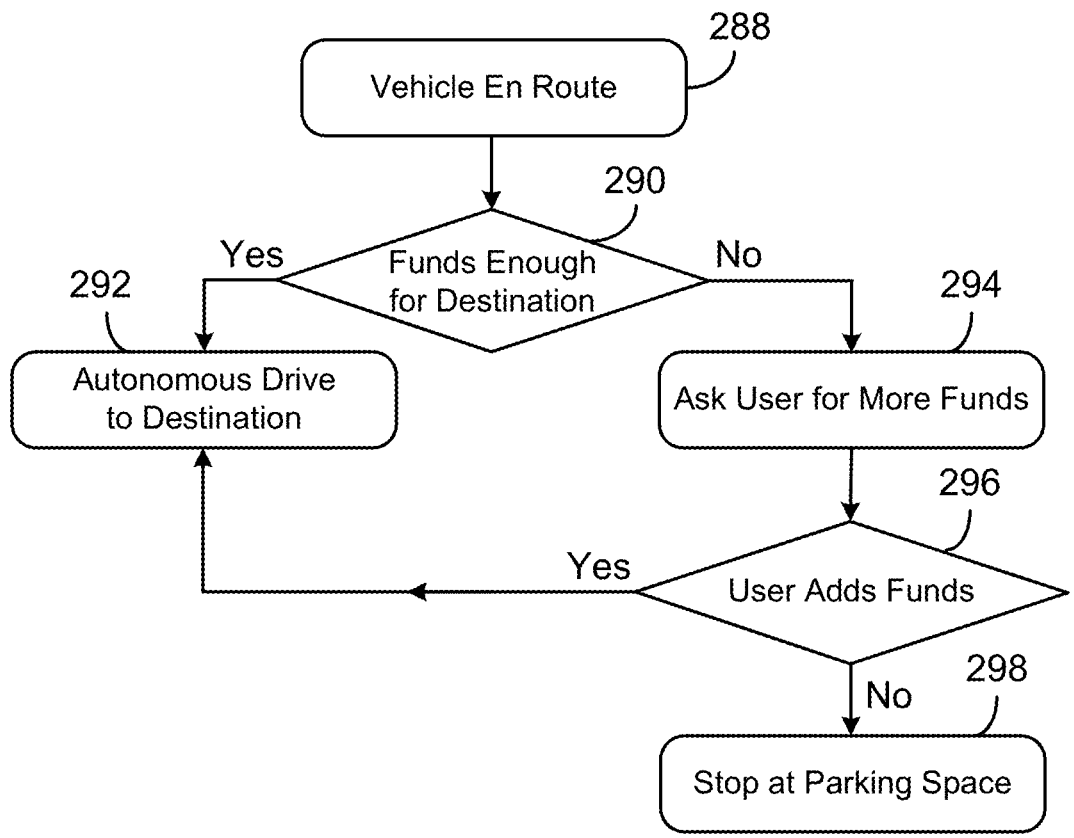

FIG. 19 is an exemplary flow diagram illustrating a vehicle operational process with funds issues in accordance with the present invention.

FIGS. 20, 21, 22, and 23 are exemplary flow diagrams illustrating several operational processes in accordance with the present invention.

FIGS. 24-A and 24-B are exemplary diagrams describing control panel configurations in accordance with the present invention.

FIG. 25 uses an exemplary diagram to show an embodiment according to the present invention.

Figure 26:
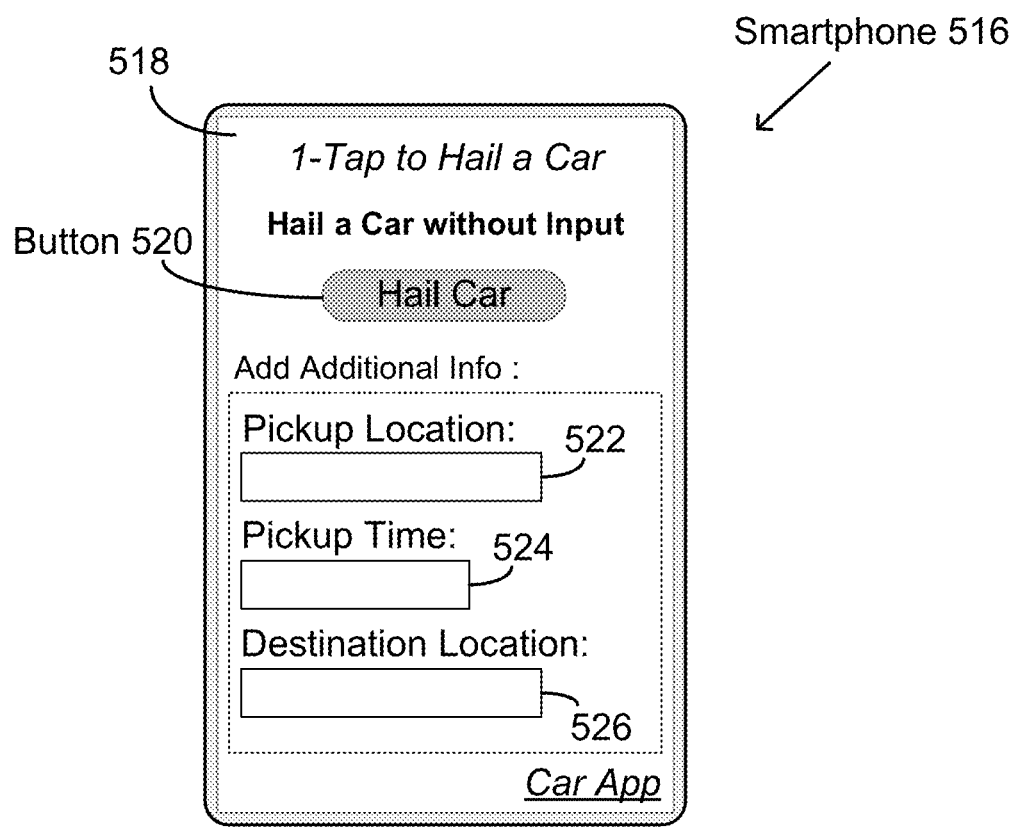

FIG. 26 depicts an exemplary diagram which shows a one-tap hailing method according to the present invention.

REFERENCE NUMERALS IN DRAWINGS

| 10 | Processor | 12 | Computer Readable Medium |
|---|---|---|---|
| 14 | Communication Network | 16 | Sensors |
| 18 | Autonomous Vehicle | 20 | Processing Module |
| 22 | Database | 24 | Control System |
| 26 | Check-in System | 28 | NFC Sensor |
| 30 | Camera | 32 | Keypad |
| 34 | Forward Button | 36 | Backward/U-turn Button |
| 38 | Turn-Left Button | 40 | Turn-Right Button |
| 42 | Knob | 44 | Forward Arrow Label |
| 46 | Backward/U-turn Arrow Label | | |
| 48 | Turn-Left Arrow Label | 50 | Turn-Right Arrow Label |
| 52 | Start Button | 54 | Stop Button |
| 56 | Control Panel | 58 | Control Panel |
| 60 | Start Button | 62 | Stop Button |
| 64 | Speed Control Module | 66 | Steering Module |
| 68 | Braking Module | 70 | Driving System |
| 72 | Server | 74 | Forward Button |
| 76 | Reverse Button | 78 | Turn-Left Button |
| 80 | Turn-Right Button | 82 | U-turn Button |
| 84 | Forward Arrow Label | 86 | Reverse Arrow Label |
| 88 | Turn-Left Arrow Label | 90 | Turn-Right Arrow Label |
| 92 | U-turn Arrow Label | 94 | Control Panel |
| 96 | Control Panel | 98 | Knob |
| 500 | Autonomous Vehicle | 502 | Icon |
| 504 | Icon | 506 | Icon |
| 508 | Parking Lot | 510 | Map |
| 512 | Screen | 514 | Intersection |
| 516 | Smartphone | 518 | Screen |
| 520 | Button | 522 | Window |

REFERENCE NUMERALS IN DRAWINGS

| 524 | Window | 526 | Window |
|---|---|---|---|
| 100-400 are exemplary steps. | | | |

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

FIGS. 1-A and 1-B are exemplary block diagrams of one embodiment according to the present invention. A vehicle 18 and server 72 are connected via a wireless communication network 14. Assume that vehicle 18 is an autonomous automobile for the purpose of illustrating embodiments. Vehicle 18 may include a vehicle control system 24 and driving system 70 responsible for vehicle navigation and driving respectively. System 24 may include a processor 10 and computer readable medium 12. Processor 10 may mean one or more processor chips or systems. Medium 12 may be the main part of a vehicle storage system and may include a memory hierarchy built by one or more memory chips or storage components like RAM, ROM, FLASH, or other suitable storage modules. Processor 10 may run programs or sets of executable instructions stored in medium 12 for performing various functions and tasks, e.g., receiving and processing data collected from sensors, retrieving map data from medium 12, sending driving signals to system 70, executing other applications, etc. System 24 may also include input, output, and communication components, which may be individual modules or integrated with processor 10.

In addition, system 24 may have a display (not shown in the figures for brevity reason) and a graphical user interface (GUI). The display may have a liquid crystal display (LCD) screen or light emitting diode (LED) screen and may be arranged sensitive to touches, i.e., sensitive to haptic and/or tactile contact with a user. The display may serve as a main display of system 24 and its interface which may be used to show vehicle status, driving conditions, current driving route, and certain options. A user may use the interface to search and retrieve information, view surrounding area maps, enter input or instructions, interact with system 24, and so on.

Driving system 70 comprises modules 64, 66, and 68 for implementing driving maneuvers which are determined by system 24. Speed control module 64 is configured to regulate the driving force or speed of vehicle 18. For a gasoline or diesel powered vehicle, module 64 contains a throttling system which controls the speed of an engine which in turn determines the speed of the vehicle. For an electric vehicle, module 64 may contain a driver system to control the speed of an electric motor. The motor speed determines the vehicle speed. Steering module 66 is arranged to control the steering torque which then adjusts the heading of the vehicle. Braking module 68 is designed to use a hydraulic brake system to decelerate the vehicle.

Many autonomous vehicles are likely owned, serviced, and managed by business entities. Assume that vehicle 18 is administered by a business called Service Center and server 72 is installed at Service Center. The word "server" means a system or systems which may have similar functions and capacities as one or more servers. Main components of a server may include one or more processors, which control and process data and information by executing software, logic, code, or carrying out any other suitable functions. Server 72 may exemplarily be divided into two blocks, represented by a processing module 20 and a database 22. Processing module 20 may include processing and communication functions. Database 22 may store vehicle service records and information, map data and geographic info of certain areas, user account information, user transaction records, etc. The database may include a cluster of aforementioned and other memory chips and/or storage modules.

Referring to FIG. 1-B, vehicle 18 may include sensors 16 to detect the external environment that surrounds the vehicle and the internal situation within it. Sensors 16 may include cameras, a radar system, a LIDAR system, a GPS device, a speed sensor, an accelerometer, an electronic compass, a suspension sensor, etc. Some cameras may be located on or exposed to the exterior of the vehicle. These cameras may be used to take images and videos of the surroundings to detect and recognize road signs, road marks, pedestrians, obstacles, other vehicles, buildings, land marks, etc. Some other cameras may be arranged inside the vehicle to sense an occupant, like whether an occupant has settled down before a vehicle is started. The radar and LIDAR systems may detect the surroundings and create a three-dimensional image which is advantageous over two-dimensional images generated by cameras. Three-dimensional images are especially useful to sense and recognize pedestrians and other vehicles. The GPS device provides the present location of vehicle 18. GPS data may be combined with info obtained from cameras, radar and LIDAR to obtain a precise location of the vehicle.

Vehicle 18 may also include a check-in system 26 through which a user may perform a check-in process. System 26 may contain a NFC sensor 28, a camera 30, a keypad 32, and other suitable sensors or interactive devices. NFC is of short-range wireless communication technology and may be employed to communicate securely between NFC devices. NFC sensor 28 may also be used to read a radio-frequency identification (RFID) tag. RFID is also a wireless technology for the purpose of data transfer, such as transfer of identification data, passively or actively. Keypad 32 may be a traditional device with physical hard (or hardware tactile) buttons or configured on a touch screen with virtual (or soft) buttons.

Check-in related sensors and devices may be located on the exterior of the vehicle or inside the vehicle. In the former case, it may be arranged that vehicle doors become unlocked only after a check-in process is done successfully. While in the latter case, a user may get in the vehicle first and then proceed with check-in procedures. Furthermore, vehicle 18 may have a voice recognition system to receive a user's verbal command or vocal input. In addition, vehicle 18 may have a gesture detection sensor to sense a user's gesture instructions.

Figure 2:
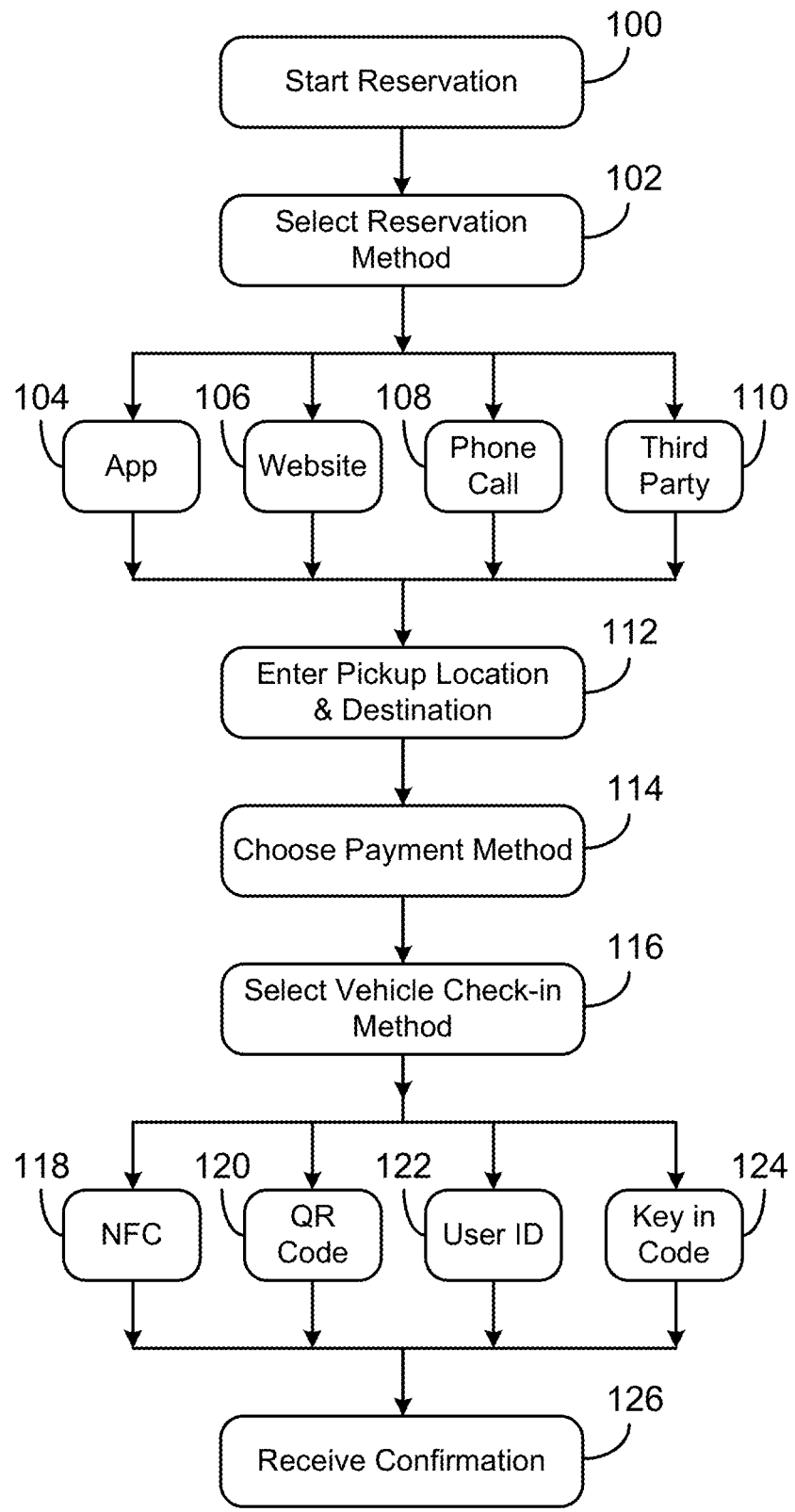
FIG. 2 is a flow diagram depicting exemplary reservation processes in accordance with the present invention.

As users with different backgrounds may ride on an autonomous vehicle when needing it, a flexible multi-option reservation process is desirable. FIG. 2 is a flow diagram illustrating exemplary booking processes according to the present invention. Assume that a user wants to reserve a vehicle at step 100. First, the user selects a reservation method at step 102. Like some other booking processes, a vehicle may be reserved via a specific app at a smartphone, certain websites, or calling a specific phone number. At step 104, an app is used. The app may be downloaded from the Internet and installed at a smartphone. At step 106, the user may reserve a vehicle on a booking website. At step 108, the user may reserve a vehicle in a phone call. A vehicle may also be reserved by a third party, as indicated at step 110. For instance, a user may book a vehicle for another user using methods just mentioned.

During a reservation process, a user name is submitted. A user name might not be a real name, though it must be based on a valid account. At step 112, the user enters pickup and destination locations. Next, payment method is selected at step 114. A user may make a payment or do it at a later time. Next, a check-in method is determined at step 116. In order to make a check-in process flexible and user-friendly, methods based on different technologies are provided. Some methods require certain devices, while some don't. And a user may choose multiple check-in methods which all enable a check-in act.

At step 118, the NFC method is selected. The method requires an NFC device which a smartphone or some smart gadgets may have. NFC method provides a fast and contactless process. When a user makes a reservation via a smartphone app, the app may create a short NFC message. Later on after the user sees a vehicle and swipes the smartphone in front of an NFC sensor of the vehicle, the vehicle may receive the NFC message and recognize the reservation. Alternatively, if a RFID tag is valid and registered, a user may also use the tag and let the tag represent a reservation. Afterwards, the user may swipe the tag in front of an NFC sensor of a vehicle to do check-in.

Assume that Service Center is involved in the reservation and check-in processes. During a reservation, a user may interact with Service Center directly or indirectly. Service Center may receive location info and payment info from a user and arrange information needed for check-in. Service Center may contact autonomous vehicles on street or in garage and send to them reservation and route information. Service Center may also dispatch autonomous vehicles to respective pickup places. Reservation, payment, and dispatch work may be conducted at Service Center automatically.

At step 120, quick response (QR) code method is used. QR code is a two-dimensional machine-readable barcode which consists of an array of black and white squares. QR code may be scanned by a scanner or a camera working as a scanner. A QR code may be generated by Service Center and sent to a user in a reservation process. A user may use a QR code when checking in a vehicle. For instance, a user may print out a QR code or display it on a smartphone. When the user checks in a vehicle, the user may let a scanner of the vehicle scan a QR-code printout or a phone screen that shows the QR code. After the code is scanned, the vehicle gets reservation info and a check-in process is completed.

At step 122, user ID is utilized. A user may provide user info and utilize user ID directly. User ID may be of an identification card or a QR code stored at user's smartphone. When a scanner of the vehicle scans the identification card or QR-code, a user may be recognized and a reservation confirmed.

For users without a smartphone, identification card, or a QR-code printout, a simple code method may be selected during a reservation, as at step 124. A code may contain one or two letters plus a numerical number or only contain a numerical number. The numerical number may contain two to four digits only, such as 12, 123, or 1234. Service center may be arranged to choose a code for a user, or a user may choose a code and get it approved by Service Center. When a user checks in a vehicle, the user may key in a code via a physical or virtual keypad. A keypad may be arranged at the vehicle, located on the exterior of or inside it. For instance, a display of the vehicle may be used to provide a virtual keypad during a check-in process. The code method requires no device and no material. Since nothing is needed but a key-in act, the method may make it possible for all users to ride an autonomous vehicle.

After a reservation is concluded, a confirmation message may be sent to the user at step 126. The message may include information on the reservation and a check-in method that has been selected. It is noted that a user may select multiple check-in methods to make it flexible and convenient. For instance, a user may choose NFC, QR code, and simple code methods. When it's time to check in, the user may use any one of them to do it.

Figure 3:
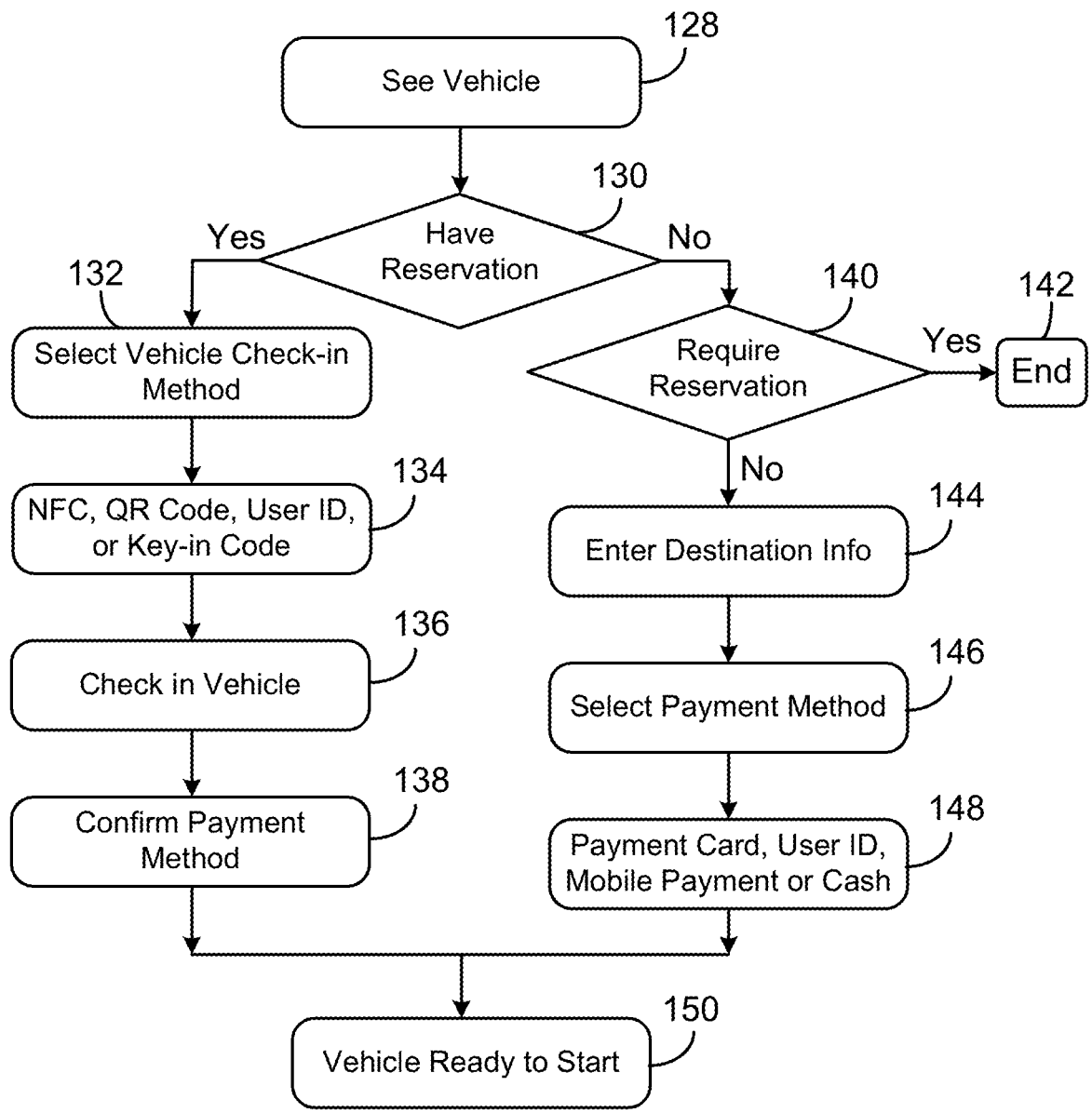
FIG. 3 is a flow diagram depicting exemplary check-in processes in accordance with the present invention.

FIG. 3 shows exemplary check-in processes according to the present invention. After making a reservation, a user may go to a scheduled pickup location in a scheduled time period and look for an autonomous vehicle. It may be arranged that a user may also ride a vehicle without reservation if the vehicle happens to be available. At step 128, a user finds a target vehicle. Step 130 is arranged to see whether the user has a reservation. If the answer is yes, the user may select a check-in method at step 132, assuming that more than one method are arranged in a reservation. At step 134, the user uses one method, such as NFC, QR code, user ID or simple code, to submit reservation information. After check-in procedures are completed at step 136, a payment method is confirmed at step 138. Depending on a user's credit records and account status, a payment may be required before or after a trip is made. Some users may pay it either way and some may have to do it before a trip begins. Next, the vehicle is ready to start the engine at step 150.

On the other hand, when a user doesn't have a reservation, the user may push a button configured on a panel of the vehicle. The button may have a label like "Ride without Reservation". Next, a control system of the vehicle may send a message to Service Center and wait for instructions from the center at step 140. If the vehicle is not allowed to take a user without reservation, the effort ends at step 142. If the vehicle can take a user without reservation, the user may get in the vehicle and start an ordering process. First, the user is asked by the control system to enter destination info at step 144. Then, the user selects a payment method at step 146. At step 148, the user may swipe a credit card or debit card at a card reader. The user may also use an electronic gadget like smartphone to make a mobile payment. If the user has an account at Service Center, submission of ID info may also work. As another payment method, the user may insert cash to pay for a trip. After a payment is made or arranged, the vehicle is ready to travel to a place at step 150.

During a reservation or ordering process, an important step is of submission of destination information. A user may use several methods to accomplish it, as illustrated exemplarily in FIG. 4. At step 152, a user prepares to give destination info to Service Center or submit it in a vehicle. The user may be in the middle of a booking process or trying to schedule a trip inside a vehicle. At step 154, the user may key in a street address and city name using a physical or virtual keypad or keyboard. When the exact address is not known, a user may enter an area name at step 156, such as ABC Shopping Mall or ABC Square.

When map mode is available, a user may find a spot on a map and then click on it using computer mouse or tap it using fingertip on a touch screen at step 158. "Map mode" as used herein may mean a map presentation state when a program shows a road-map view on a screen of a display. A user may click or tap on a spot of a map to select a place as pickup or destination location when map mode is on. For instance, a screen may show a map and an icon with a label "Select Destination". It may be designed that once the icon is clicked or tapped, its color becomes brighter. Then a user may click or tap a spot on the map to designate it as destination. Next, a sign may appear at the spot with a label like "Destination" which gives assurance to the user. If the user thinks it is not the intended place, the user may click or tap the icon again and select another spot on the map instead. The processes are handled by a server at Service Center or a control system of a vehicle.

If a user doesn't know the exact destination location but has certain knowledge of an approximate target area, the user may draw a circle on a map to indicate it and use it as a destination area at step 160. Moreover, a user may use other shapes or scribbling to cover a destination area. For instance, it may be designed that a user may tap "Select Destination" icon and then scribble on a map using computer mouse or fingertip. The scribbling act may generate a curve which may overlap an area. The area may be defined by one or more areas enclosed by the scribble curve and a straight line which connects the start and end points of the curve. Thus a user may use the icon and scribbling to create a destination area on a map quickly and easily.

Figure 4:
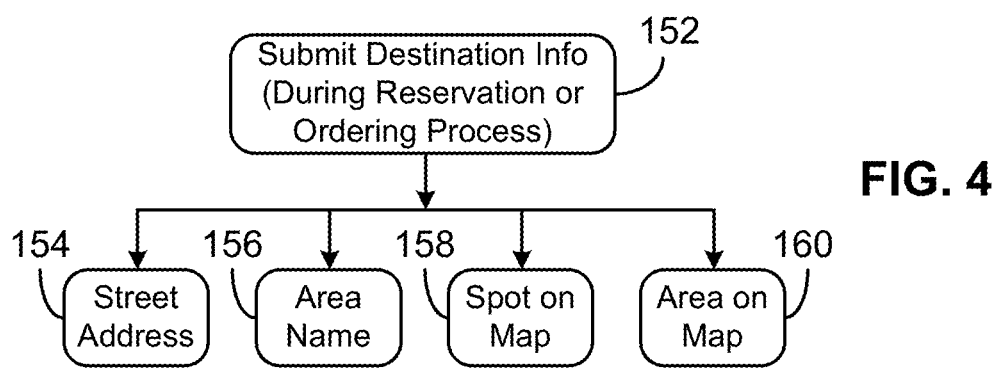
FIG. 4 is an exemplary illustration to depict methods to submit destination info in accordance with the present invention.

It is noted that the processes described in FIG. 4 may be administered either by a server at Service Center, like server 72 of FIG. 1-A, or a control system of a vehicle like control system 24 of FIG. 1-A. The server or control system may present a map and a "Select Destination" icon on a display in a booking or ordering process. If it is in a vehicle, an interface of the control system may be utilized to show the info. Once the server or control system detects that a user activates the icon and then clicks or taps a spot or draws a curve on the map within a given time period, the spot or a curve-defined area may be recorded and designated as a destination place or destination area. Then the server or control system may present a symbol with a label "Destination" at the spot or in the area.

FIG. 5 is an exemplary diagram describing vehicle identification methods according to the present invention. When a user goes to a scheduled location to look for an autonomous vehicle booked in advance, the user may get confused if there are multiple vehicles waiting for users to check in, even though vehicle make, model, and color are known. For instance, pick-up areas at a shopping district, a railroad station, and an airport might get crowded with autonomous vehicles quite often. Thus, there is a need for a vehicle to show a distinctive identification object to users around it. The identification object may be certain content shown on a display panel, a symbol, or any other suitable object configured on or exposed to the exterior of a vehicle. A user may select an identification object during a reservation process, when Service Center provides a number of choices. An identification object may also be chosen by Service Center and presented to a user during a reservation process or sent to a user before a scheduled pickup time. After assignment of identification object, Service Center may transmit the information to a vehicle along with other info. At step 162, a vehicle is ready to display an identification object. The object is arranged to get attention of a user who has made a reservation.

At step 164, the vehicle may show a picture on an electronic display panel. A user may be notified of the picture in a confirmation message. The picture may be arranged easy to recognize and remember, like a well-known landmark, building, attraction, an easy-to-remember animal like elephant, tiger, horse, etc. The panel may be located on the rooftop of or behind the windshield of the vehicle. In addition, the panel may also be used to display a user's name as an identification token, if the user agrees to do so.

At steps 166 and 168, the vehicle may show a symbol or logo for identification. The symbol or logo may be displayed behind the windshield. At step 170, a simple code is used for vehicle identification. The code may be arranged short and simple, containing a one-digit to three-digit number or a letter plus a one-digit to three-digit number. The code may be displayed using a panel like discussed at step 164.

Alternatively, for users using a specific app, a map may be displayed at a smartphone. The exact location of a vehicle may be indicated on the map, possibly with references around it, like a building, a store, a gate, or a road sign.

In addition, as multiple vehicles may be parked at the same place, Service Center may check whether an identification object is already used at the location in a similar time period before assigning it to a vehicle. If an object is already used by another vehicle, Service Center is arranged to assign another one to a reservation or ask a user to have another choice.

An autonomous vehicle means a driverless or self-driving vehicle. Thus a user doesn't need to do anything involving driving and navigating actions. However in real life, some users might want to get involved in the navigating part when there is a need to take a path not covered by a route made in a reservation. For instance, a user may want to take a detour to avoid a congested intersection or pick up a friend during a trip. Therefore, there is a need for a user to navigate an autonomous vehicle easily and conveniently. Since some users may be unfamiliar with vehicle driving, procedures to navigate an autonomous vehicle are preferred to be simple and intuitive. One embodiment is shown graphically in FIG. 6-A, where an exemplary control panel 56 is arranged for a user to navigate an autonomous vehicle.

Control panel 56 may be placed beside a front seat of a vehicle in a plane parallel to the vehicle floor or the ground. Panel 56 may also be located in a dashboard area. The panel may include buttons 34, 36, 38, 40, 52 and 54. The buttons may be physical hard buttons or virtual soft buttons, wherein a touch screen may be used in the latter case. Button 52, with a label "Start", is arranged to start a vehicle. Once a vehicle control system detects that button 52 is pushed, it may send signals to a driving system to start an engine or motor of the vehicle. It is noted that after button 52 is pushed, the vehicle may still stay at the current place, even though its engine or motor is running. Button 54, with a label "Stop", is designed for stopping a vehicle. After a user pushes button 54, the control system receives a signal to stop the vehicle. The control system then sends signals to the driving system which implements a stopping maneuver. Buttons 34, 36, 38, and 40 are configured for performing different driving maneuvers. The four buttons, as navigational buttons, represent forward, backward/U-turn, turn-left, and turn-right respectively. The buttons each have an arrow mark, indicating a direction a button represents. Among the navigational buttons, only button 36 has dual functions. Button 36 may cause a vehicle to reverse, i.e., going backwards in a direction opposite that the vehicle's front end points at, or make a U-turn, depending on road conditions and arrangement.

The navigational buttons work differently from a steering wheel in that pushing a button doesn't make a vehicle to do a task directly. For instance, a user may turn a vehicle right away when the user turns a steering wheel of a conventional driver-operated automobile. However, when a turn-right button 40 is pushed, for instance, a signal is sent to a control system. Upon receiving the signal, the control system first ascertains whether it is legal or allowable to do it. If the answer is yes, the control system calculates a route segment based on the request, road conditions, and situations of other vehicles. It is possible that the vehicle may not be able to turn right at an intersection ahead if a request comes in too late or it is not safe to do so. Thus, when a user pushes a button, the user merely makes a request, issues a command, or gives instructions for a driving maneuver, while the control system determines whether the maneuver can be implemented.

The four navigational buttons represent the minimum need for directional control, satisfying navigation for four directions. They also represent the simplest arrangement, which may make it easy and convenient for a user to use. Thus the buttons may make navigating an autonomous vehicle easy, simple, and intuitive. In addition, navigational options may be presented on a display of the vehicle. A user may select an option to submit instructions for going straight or making a turn. Since such a display may present other contents and other options, it may look complicated and may not be preferred by some users. More examples of using the navigational buttons are discussed in below sections.

FIG. 6-B shows schematically another embodiment according to the present invention. An exemplary control panel 58 functions in a similar way to panel 56. Control panel 58 may be arranged beside a front seat of a vehicle or on a dashboard. Buttons 60 and 62 are arranged for starting and stopping the vehicle respectively. It is seen that a navigational request is submitted via a knob 42 of a joystick. Knob 42 may be shifted to four positions at four directions, represented by four arrow labels 44, 46, 48, and 50. The four positions correspond to forward, backward/U-turn, turn left, and turn right respectively. Hence, comparing to pushing buttons as in FIG. 6-A, a user may shift knob 42 to four places, resulting in the same navigational effect. The four shifting places also represent the simplest arrangement for navigational needs. The shifting arrangement, like the button arrangement of FIG. 6-A, is intuitive for a user to use.

It is noted that a user may navigate an autonomous vehicle freely without worries on safety issues. Firstly, a user's command or navigational request for a maneuver is only a request, not a driving order. Secondly, a control system only implements a command or request when it is determined that a corresponding maneuver is legal, safe, and doable. Thus, a user's navigational demand won't cause any risky or illegal driving incidents.

FIG. 7 shows a schematic flow diagram of an embodiment, which describes a pre-journey situation. After a control system of a vehicle confirms a reservation and payment status, the vehicle is ready to set forth. For a user's comfort, the control system may ascertain whether a user has taken a seat and settled down at step 172. In the process, images and videos taken by inside-vehicle cameras and data from other suitable sensors are utilized. After it is determined that the user has settled down, the control system may perform safety procedures at step 176, such as checking whether a safety belt is buckled up and whether vehicle doors are closed. Once the safety check is passed, the control system may start vehicle engine at step 178 and travel along a scheduled route.

In case that a user is in a hurry and wants to start the vehicle sooner, the user may use a start button, like button 52 of FIG. 6-A. The user may push the start button at step 174 before the control system concludes that the user settles down. Once the control system receives a signal indicating that the start button is activated, the system may begin a safety check immediately at step 176 and then proceed to start the engine at step 178. Hence, two options are provided for a user. In one option, a user doesn't push a start button, and the engine starts at a predetermined pace automatically. In the other option, a user pushes the start button to speed up the process. So step 174 is arranged to save a little bit of time for a user and more importantly, to reduce the anxiety level of a user.

After the engine is started at step 178, a vehicle may begin travelling automatically in autonomous mode within a given time frame, for instance, within ten to twenty seconds. Back to step 178, if a user wants to waste no time, the user may push any navigational button, such as "Forward" or "Backward/U-turn" button. After the control system receives a signal caused by the button pushing act, it may calculate a trajectory and transmit signals to a driving system of the vehicle and the driving system may get the vehicle to move immediately. For instance, after any of the navigational buttons is pushed, the control system may make the vehicle reverse to back out of a parking space and then go forward autonomously. Thus, besides pushing a start button, a use may also push a navigational button to make a vehicle start a journey a little bit sooner.

Figure 8:
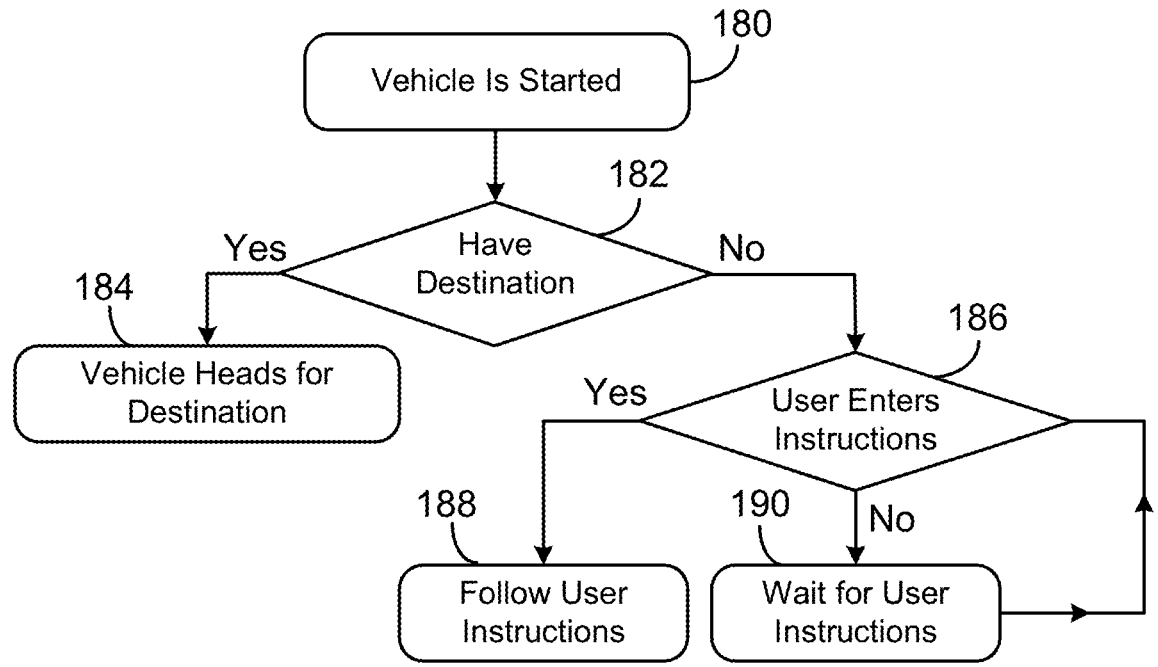

FIG. 8 shows an exemplary flow diagram describing an embodiment according to the present invention. Assume that an engine of a vehicle is started at step 180 and the vehicle is ready to maneuver in autonomous mode. At step 182, a control system of the vehicle determines whether destination info is received from Service Center or a user. If the control system has destination info, step 184 is taken and the vehicle navigates autonomously towards a destination along a scheduled route. If the control system has no info on destination, step 186 is taken where the control system monitors whether the user enters any instructions. If the user hasn't submitted any instruction, the control system waits for it at step 190 for a given time period before returning to step 186. Once the user submits user instructions, like pushing a navigational button, the control system may receive a signal and start working to implement the instructions at step 188. For instance, if the user pushes a forward button, the control system may calculate a route segment and manage to drive the vehicle in a forward direction for a given distance.

Thus it is seen that a vehicle may start traveling with or without information on destination. When there is no destination info, a vehicle may travel based on navigational instructions received from a user. The instructions may be processed by the control system and implemented by a driving system of the vehicle. Therefore, a user may navigate an autonomous vehicle flexibly in multiple ways.

Figure 9:
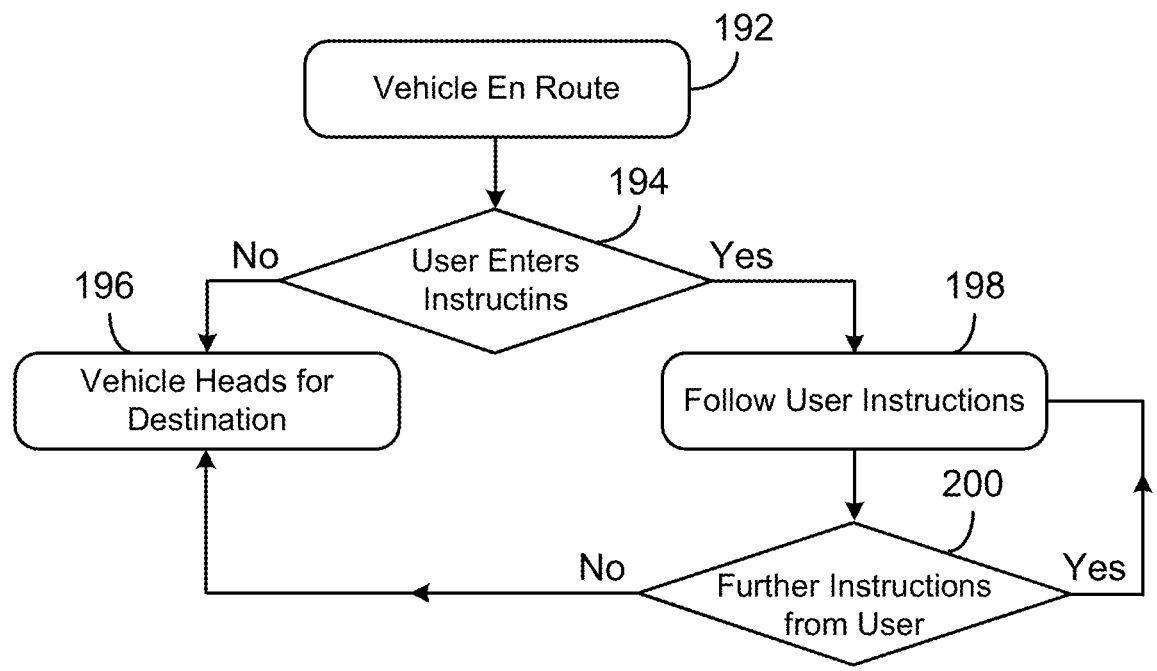

FIG. 9 shows another exemplary flow diagram describing an embodiment according to the present invention. Assume that a vehicle is travelling towards a destination on a roadway in autonomous mode at step 192. On the journey, a control system of the vehicle keeps processing signals coming from certain sensors and devices. One of the tasks is to monitor whether a user has entered any instructions, as shown at step 194. If there is no user input, the vehicle navigates autonomously to the destination as planned at step 196. If the user enters a command to request a maneuver, such as pushing a turn-left button, the control system makes calculation and sends signals to a driving system of the vehicle in response to the request at step 198. The signals are generated for performing the maneuver.

It is noted that a request from a user only represents a one-time attempt. For instance, if a user pushes a turn-left button, the control system may schedule a left turn upon receiving the info. After the left turn is made, the control system may wait for further instructions from the user at step 200. Before receiving new instructions, the control system may be arranged to keep the vehicle traveling straight along the roadway without making any turns within a predetermined distance. When the vehicle approaches a 3-way intersection where only left turn and right turn are available, it may remain on the same roadway if the roadway continues or turn right if the roadway ends. A predetermined distance may be arranged to be the distance a vehicle travels starting from the location where the user enters instructions. The length of a predetermined distance may be determined by Service Center and arranged, for example, around a quarter of mile or half a mile. If no further input is received from the user after the vehicle travels the predetermined distance, the control system is arranged to calculate a route to the destination and then navigate the vehicle along the route. If additional user input is received before the vehicle travels the predetermined distance, step 198 is taken once again.

Figure 10:
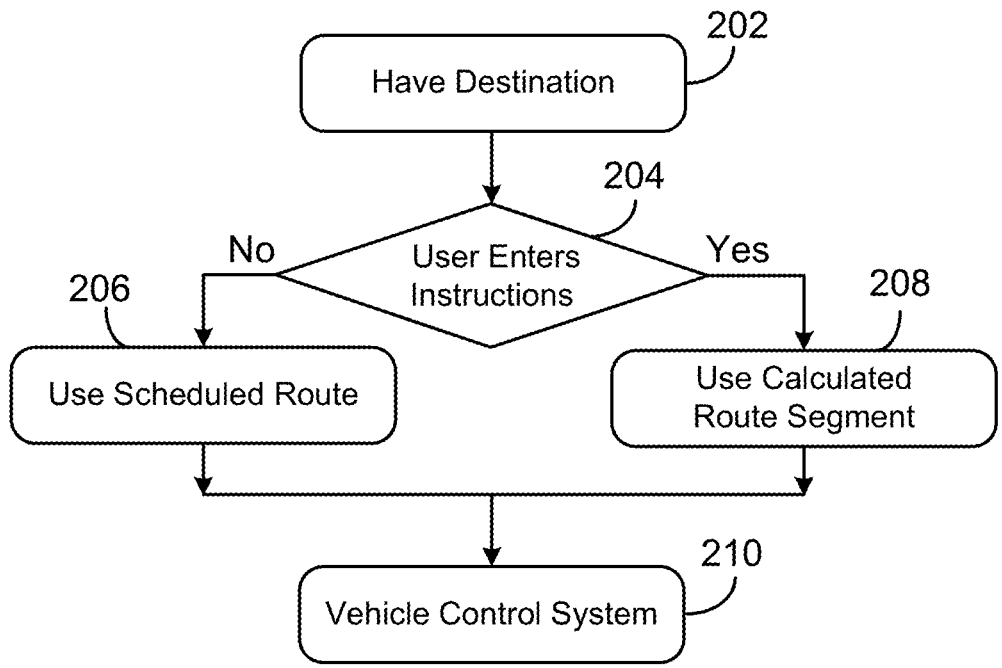

In FIG. 10, yet another exemplary flow diagram describing an embodiment is presented according to the present invention. At step 202, assume that a vehicle is navigating towards a destination on a roadway in autonomous mode. At step 204, a control system of the vehicle is monitoring whether a user inputs any instruction. If the control system doesn't receive any user command, a scheduled route which leads to the destination remains valid at step 206. The control system navigates the vehicle along the scheduled route at step 210. Once the control system receives a signal that the user enters instructions, for instance, a navigational button is pushed or a knob is shifted, the system is arranged to calculate a route segment accordingly and cause the route segment to replace the scheduled route at step 208. Next, the control system may generate signals based on requirements of the route segment and use the signals to drive the vehicle on a new route at step 210.

Figure 11:
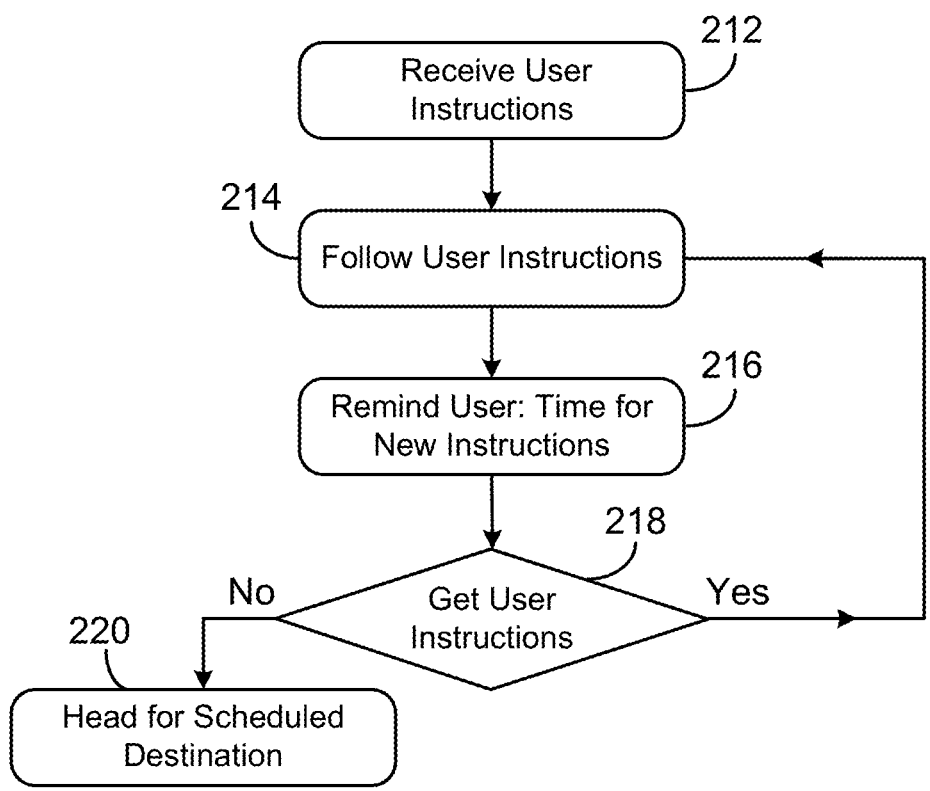

FIG. 11 shows another exemplary flow diagram describing an embodiment according to the present invention. Assume that during an autonomous drive to a destination, a control system of a vehicle obtains instructions from a user at step 212. Next, the control system processes the order and drives the vehicle accordingly at step 214. After the control system manages to perform a maneuver as requested by the user, it is arranged to navigate the vehicle autonomously based on prearranged rules. For instance, the control system may guide the vehicle along a road within a predetermined distance. As aforementioned, the length of a predetermined distance may be determined by Service Center and arranged, for instance, around a quarter of mile or half a mile. A user may enter instructions anytime and repeatedly, which prompts the control system to take actions and navigate the vehicle as instructed. Meanwhile the control system may monitor whether the vehicle has traveled the predetermined distance after receiving each individual order from the user. When a user doesn't submit any new navigational order within the predetermined distance, the control system may calculate a new route and navigate the vehicle to the destination.

After the vehicle has traveled, for instance, two thirds of the predetermined distance, the control system may be designed to remind the user of the need for new instructions at step 216. A display may be used to show a message. The display may be of an interface of the control system. Vehicle driving status, maps of nearby areas, current route, and destination info may be presented in the interface. The interface may also show available user commands, past user instructions, notifications, and a reminder to ask the user to enter new instructions. Examples of reminders may include "Time to Enter New Instructions". If the user doesn't submit any new instruction within the predetermined distance at step 218, the control system directs the vehicle to the scheduled destination at step 220 and a message may appear on the display with a sentence like "Go to Destination". If the user enters new instructions before the predetermined distance is traveled at step 218, step 214 is re-taken and next, a new round may begin.

Figure 12:
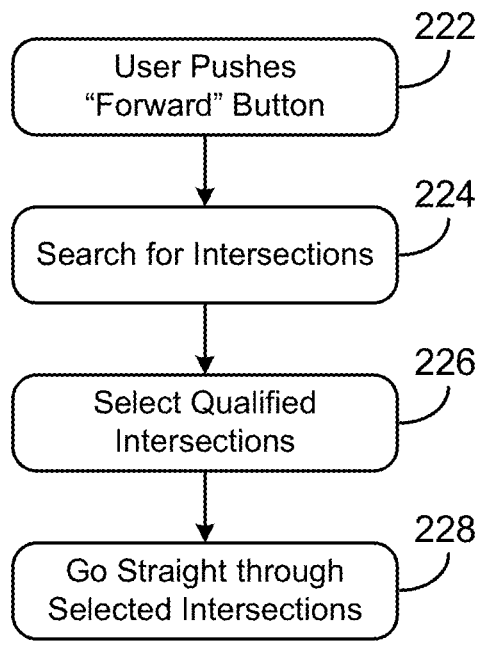

FIG. 12 shows an exemplary flow diagram describing an embodiment related to pushing a forward button according to the present invention. Assume that a vehicle is traveling in autonomous mode and a user pushes a forward button at step 222. The forward button may be button 34 of FIG. 6-A with the same functionality. After the user pushes the button, a signal is sent to a control system of the vehicle. The control system may be like system 24 of FIG. 1-A. Upon receiving the signal, the control system ascertains intersections ahead and locates the first one at step 224. During the trip, the control system may use sensors of the vehicle to detect the surrounding environment including road, pedestrian, and vehicle factors continuously. Map data may also be retrieved from the vehicle's storage or Service Center continuously. As the measurement and map data are ready, the control system calculates a route segment for the vehicle to follow. But the control system may not be able to make the vehicle to go straight through the first intersection. First, the control system has to determine whether it is legal to go straight. If it is illegal, the system declines to implement the order. Second, it may be unsafe to go straight at the first intersection. For instance, the vehicle may be preparing to make a turn according to a scheduled route and thus may not be able to shift a lane in time. If it is legal and doable to go straight through the first intersection, the control system calculates a route segment and sends signals to a driving system of the vehicle which then implements certain maneuvers. If it is too late to do it, the control system may navigate the vehicle using the scheduled route and show a message on a display to notify the user. The message may be like "Sorry, Failed to Go Straight. Any New Instruction?" or some other contents with similar meaning.

When road conditions are favorable and the control system carries out the instructions, the vehicle travels straight through the first intersection without making a turn. Next, the user may push another navigational button as a new order and the control system may manage to implement it accordingly. If the user doesn't enter new command after passing through the first intersection, the control system may be arranged to guide the vehicle following certain rules. First, the control system may navigate the vehicle to go straight through one or more intersections within a predetermined distance starting from a location where the user enters the instructions, when traveling straight through the one or more intersections is allowed. As aforementioned, the length of a predetermined distance may be determined by Service Center and arranged, for instance, around a quarter of mile or half a mile. Second, when the vehicle approaches a 3-way intersection where only left turn and right turn are available, it may stay with the current roadway if the current roadway turns as well or turn right if the current roadway ends. Third, after the predetermined distance is traveled, the control system may navigate the vehicle to go to a prearranged destination or to a parking spot and stop the vehicle there if there is no destination info. Thus after passing the first intersection, the control system may monitor a distance the vehicle has traveled, ascertain other intersections straight ahead, and select some intersections which are located within the predetermined distance at step 226. The control system then navigates the vehicle to go straight through the selected intersections in the absence of user instructions at step 228. When approaching a selected intersection, the control system may show a message on a display to inform the user of an incoming event. Examples of this kind of message may include "Go Straight through the Next Intersection".

It is noted the control system calculates a route segment after receiving user instructions and navigates the vehicle through the first intersection along the route segment. Since the control system also needs to navigate the vehicle along a new route after passing the first intersection, it may be arranged that the control system calculates another route segment after generating the first one. In other words, the control system may calculate two route segments consecutively. The first route segment is for passing the first intersection and the second one for autonomous driving after that. The total length of the two route segments may equal the predetermined distance. The second route segment may not be traveled by the vehicle completely, because the user may enter new instructions to interrupt it before the end of the second route segment.

Figure 13:
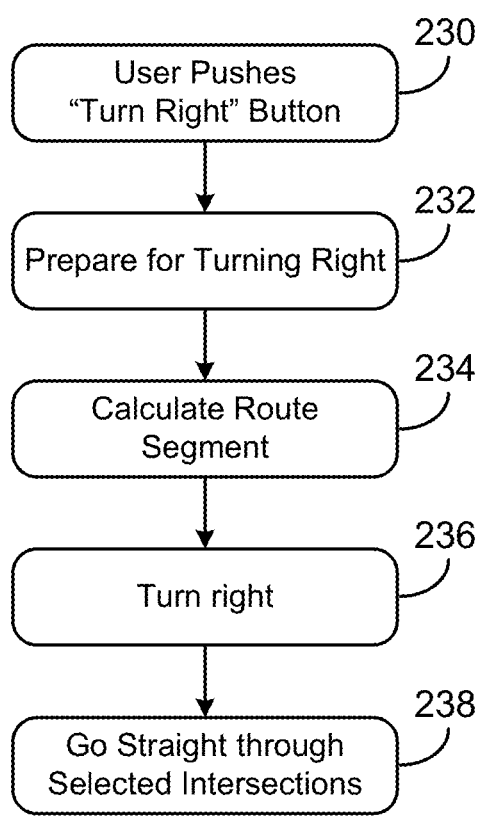

FIG. 13 shows an exemplary flow diagram describing an embodiment related to pushing a turn-right button according to the present invention. Assume that a vehicle is traveling in autonomous mode and a user pushes a turn-right button at step 230. The turn-right button may be button 40 of FIG. 6-A with the same functionality. Next, a signal prompted by button activation is sent to a control system of the vehicle. After receiving the signal, at step 232, the control system ascertains the next intersection using measurement data obtained from sensors of the vehicle and map data retrieved from a vehicle storage device or Service Center. The control system may calculate a first route segment for turning right at the intersection at step 234. But there is a chance that the vehicle may not be able to turn right at the next intersection. First, it may be illegal to turn right at the intersection. Second, it may be unsafe to do it. For instance, the vehicle may be in a middle lane and there may not be enough time to shift a lane to the right. If it is doable to turn right at the intersection, the control system sends signals to a driving system of the vehicle which then implements maneuvers to make a right turn at step 236. If it is illegal or impractical, the control system may decline the request and navigate the vehicle along a scheduled route and show a message on a display to notify the user. The message may be like "Sorry, It Is illegal to Turn Right. Any New Instruction?", "Sorry, Failed to Turn Right. Any New Instruction?" or some other contents with similar meaning.

If road conditions are good for implementing the user's request, the control system directs the vehicle to make a right turn at the intersection. Next, the user may push another button to submit new instructions and the control system may manage to implement a new order. If the user doesn't enter new instructions after making the turn, the control system may be arranged to guide the vehicle along a second route segment which may be calculated after the first route segment is created. The second route segment may be calculated following certain rules. First, the vehicle may be arranged to go straight through one or more intersections within a predetermined distance starting from a location where the user enters the instructions for turning right, when going straight through the one or more intersections is allowed. The predetermined distance may be defined in the same way as aforementioned one. The total length of the first and second route segments may be arranged to equal the predetermined distance. Second, when the vehicle approaches a 3-way intersection where only left turn and right turn are available, it may stay with the current roadway if the current roadway turns as well or turn right if the current roadway ends. Third, after the predetermined distance is traveled and there is no user instruction submitted, the control system may navigate the vehicle to a prearranged destination or to a parking spot and stop the vehicle there if it has no info on destination. Hence, after making the vehicle turn right at the first intersection, the control system may navigate the vehicle along the second route segment and travel straight through selected intersections in the absence of user command at step 238. When approaching a selected intersection, the control system may show a message on a display to inform the user of an upcoming event. Examples of the message may include "Go Straight through the Next Intersection".

It is noted that the same method and arrangement as discussed regarding a turn-right request applies to cases where a turn-left request is submitted.

Figure 14:
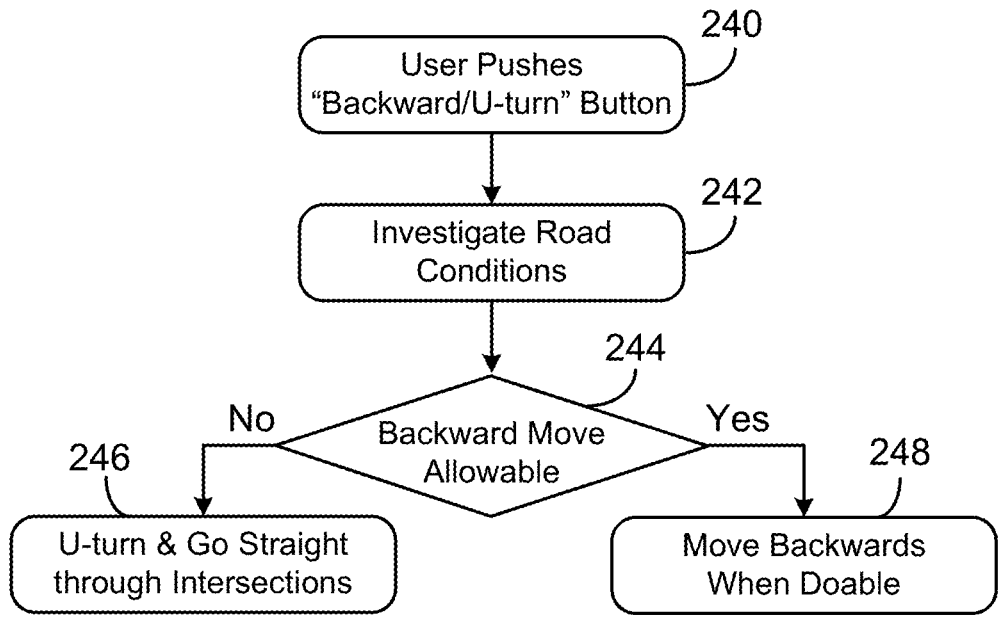

FIG. 14 shows an exemplary flow diagram describing an embodiment related to pushing a backward/U-turn button according to the present invention. Assume that a vehicle is traveling or stopping on a road in autonomous mode and a user pushes a backward/U-Turn button at step 240. The button may be button 36 of FIG. 6-A with the same functionality. After the user pushes it, a signal is sent to a control system of the vehicle. The control system may be like system 24 of FIG. 1-A. Prompted by the signal received, the control system may utilize measurement data and map data to evaluate road conditions and feasibility of reversing and U-turn at steps 242 and 244. First, the control system investigates whether it is legal for reversing and U-turn. It is known that driving in reverse is illegal on a highway and U-turn is not allowed at some intersections. If reversing is allowed, the control system may calculate a trajectory and move the vehicle backwards for certain yards at step 248, say ten to twenty yards. If the control system gets info that reversing is not allowed but U-turn is allowed, the system may be arranged to navigate the vehicle to make a U-turn. Thus the backward/U-turn button may be used to carry out two different functions. It may be arranged that when reversing is allowed, no matter whether U-turn is allowed or not, the control system performs a reversing action; and when reversing is not allowed but U-turn is allowed, the control system implements a U-turn act. In addition, when both reversing and U-turn are allowed, two icons with labels "Reverse" and "U-turn" may show up on a touch screen of a display, such as an interface of the control system. A message like "Please Select One Option" may be configured to appear on the screen to remind the user of the choices. The user may tap an icon to select one option. If no icon is tapped within a given short time period, the control system may choose a reverse act and make it happen when it is doable.

If it is time to make a U-turn at an intersection, the control system sends signals to a driving system which then implements maneuvers to turn around at step 246. If it is impossible to make it, the control system may navigate the vehicle along a scheduled path and show a message on the screen to inform the user. The message may be like "Sorry, Failed to Make U-Turn. Any New Instruction?" or some other contents with similar meaning.

Assume that the control system fulfils user instructions and makes the vehicle perform a U-turn. Next, the user may push another button as new instructions and the control system may manage to implement a new order. If the user doesn't enter new instructions after the U-turn, the control system may be arranged to guide the vehicle following certain rules. First, the vehicle may be arranged to go straight through one or more intersections within a predetermined distance starting from a spot where the user enters the latest instructions, when traveling straight through the one or more intersections is allowed. The predetermined distance may be defined in the same manner as aforementioned one. Second, when the vehicle approaches a 3-way intersection where only left turn and right turn are available, it may stay with the current roadway if the current roadway turns as well or turn right if the current roadway ends. Third, after the predetermined distance is traveled without receiving new instructions, the control system may guide the vehicle to a prearranged destination or to a parking spot and stop there if there is no destination info. Thus after making a U-turn, the control system may search other intersections straight ahead and select some intersections which are located within the predetermined distance. The control system then navigates the vehicle to go straight through the selected intersections in the absence of user instructions, which is illustrated at step 246 as well. It is noted that when processing a user request to make a U-turn, the control system may calculate two route segments, one segment for implementing the U-turn while the other for navigating the vehicle after making the U-turn. Again, the total length of the first and second route segments are arranged to be equal to the predetermined distance.

Figure 15:
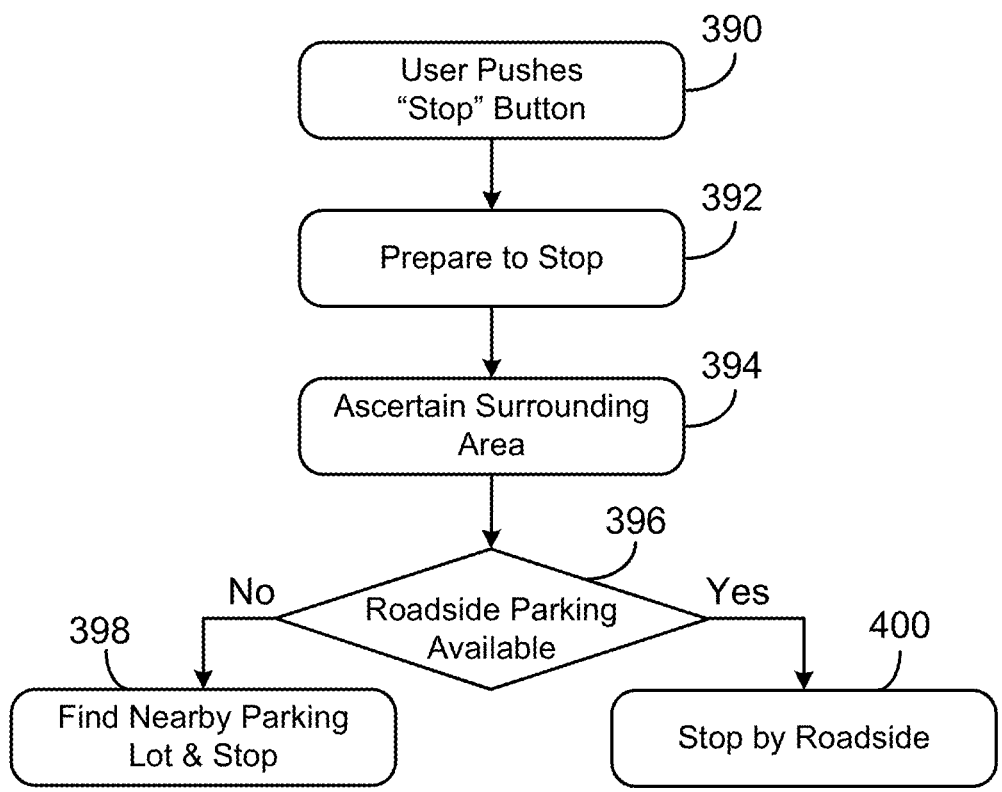

FIG. 15 shows an exemplary flow diagram describing an embodiment related to pushing a stop button according to the present invention. Assume that a vehicle is traveling on a road in autonomous mode and a user pushes a stop button at step 390. The stop button may be of button 54 of FIG. 6-A with the same functionality. Once the button is pushed, a signal is sent to a control system of the vehicle. As detection on surrounding environment is conducted continuously, measurement data is updated all the time. After the control system receives the signal of stop button, at steps 392 and 394, the system prepares to stop and starts to evaluate the surroundings using measurement results and map data retrieved from a storage device or Service Center. The control system may ascertain road marks and signs to determine whether it is allowed for roadside parking at step 396. If roadside parking is allowed and available, the control system may calculate a trajectory and stop the vehicle by roadside at step 400. If roadside parking is not allowed or unavailable, the system may find a nearby parking lot, calculate a trajectory, and then autonomously drive the vehicle there along the trajectory at step 398.

FIG. 16 shows an exemplary flow diagram describing an embodiment according to the present invention. Assume that at step 250, an autonomous vehicle stops at a place after traveling a distance. A user is still inside the vehicle. A control system of the vehicle monitors whether the user leaves the vehicle at step 252. Cameras and other suitable sensors may be used at the step. If it is detected the user gets off the vehicle and walks away, a check-out process is performed automatically for the user at step 254. If the user remains in the vehicle, the control system monitors whether a start button is pushed at step 256. If the start button is not pushed, the control system awaits user input at step 260 and repeats doing step 252 at the same time. If the start button is pushed at step 256, the control system starts checking whether destination info is obtained at step 258. If the control system obtains destination info, it calculates a route and navigates the vehicle to a destination autonomously at step 262. If the control system doesn't have destination info, it may follow user instructions, create route segments, and navigate the vehicle along the segments respectively at step 264.

FIG. 17 shows an exemplary flow diagram describing an embodiment related to stopping in a destination area according to the present invention. Assume that at step 266 an autonomous vehicle arrives in or is approaching a destination area. When a control system of the vehicle receives data that the vehicle is within a given distance from a destination, say half a mile, the system may present a map of the destination area on a touch screen of a display. The screen may be the interface of the control system.

On the other hand, an icon may be configured on the screen with a label such as "Map Mode". Once the control system receives a signal indicating that "Map Mode" icon is tapped, the system shows a map covering surrounding areas of the vehicle. So a user may get a map on screen anytime when needed, whether the vehicle is driving on a road or stopped at a parking lot. A map may be retrieved from a storage device at the vehicle or from Service Center. If a destination location is known, the map may show the location with an illustrative label "Destination". As shown when embodiments of FIG. 4 are discussed, a user may use "Select Destination" icon when there is a need to enter or change destination info. For instance, after activating "Select Destination" icon, the user may tap a spot on the map to choose it as a destination or a new destination which may replace an old one.

It is known that a regular road map may not contain some detail of an area. For instance, it may not show some side paths or alleys and in many cases, doesn't show a parking lot or parking spots. In addition, by its inherent static nature, a regular map doesn't show which parking spot is currently occupied and which is available at a location, even though the info is useful for users looking for a parking space. Thus, there is a need to create an improved or enhanced map. An improved or enhanced map is especially helpful for destination area where parking a vehicle at a preferred spot is desirable for users.

After a vehicle enters a destination area, the control system may start sensing the detail of the surrounding environment, especially parking spots, using sensors of the vehicle. The sensors may include aforementioned cameras, radar and LIDAR devices. The control system may create an enhanced map by combining a regular map with the measurement data obtained currently or in real time. From the measurement, the control system may ascertain road marks and signs, parking marks and signs, surrounding buildings and facilities, and surrounding vehicles to recognize existing paths and available parking spots. Existing path may mean a path that exists and a map may or may not show it. Available parking spot may mean an unoccupied parking space where a vehicle may stop or be parked. The control system may compare measurement results with a matching map area to determine paths and parking spots that the map lacks. Then the detected paths and parking spots are added to the map by superimposing method to create an enhanced map. The enhanced map may be arranged to show existing paths and available parking spots in surrounding areas. It may also show vehicles which are already parked there to make surrounding images more realistic.

In addition, since radar and LIDAR devices provide a three-dimensional image, the control system may utilize radar and LIDAR data to create a perspective enhanced map. A perspective map provides a perspective view, while a regular map is a flat map, which is a projection of the surface of an area onto a two-dimensional plane. A perspective map is easier to view and comprehend than a regular map. When both perspective enhanced map and flat enhanced map are available, Service Center may decide what type of map to use. Alternatively, options such as icons may be presented on a display of the vehicle so that a user may have a chance to select which enhanced map to use. For instance, a user may tap on an icon to choose one type of the enhanced map and the control system may be arranged to present it. In addition, it may be arranged that once an enhanced map is generated by the control system, it replaces a regular map and appears on the display.

Available parking spot on an enhanced map may be represented by a parking symbol which has certain shape and color for easy recognition and selection. An icon, as an interactive element with a label like "Parking Spot", may be configured on the screen. A user may tap "Parking Spot" icon to begin a process to select a parking space. For instance, a user may tap "Parking Spot" icon and then tap a parking symbol at a spot, which may be sensed by the screen and cause a signal to be sent to the control system. It is noted that tapping a parking symbol and tapping a parking spot mean the same action, since the symbol is configured at the parking spot. The control system, employing multiple programs and/or algorithms, may change the color of the selected parking symbol, calculates a trajectory, and makes a driving system to drive the vehicle along the trajectory and stop it at the spot.

It may also be designed that no matter where the vehicle is, when the control system receives instructions to stop the vehicle, the system starts gathering data of the surroundings and generating an enhanced map on a screen. The control system then shows available parking spots on the enhanced map for a user to select. Sometimes after a vehicle is stopped at a destination location, a user may want to move the vehicle to another place in the same area. If map mode is still on, the user may tap "Parking Spot" icon and then tap a parking symbol at a preferred parking space. Once the control system receives a signal caused by the tapping acts, it guides the vehicle to leave the current location and drive to the selected place.

Referring to step 268, an enhanced map may show nearby parking spots on the screen and the control system may be monitoring whether a user enters any instructions, like tapping "Parking Spot" icon on the map, pushing a stop button or a navigational button. If the control system doesn't receive any input from the user, it may navigate the vehicle to a scheduled location at step 270. If the destination info contains area information but doesn't include a street address or exact address, the control system may navigate the vehicle to any available parking spot in the destination area.

If the user enters instructions, such as pushing a navigational button, the control system may take the command and create a corresponding trajectory at step 272. For instance, after a turn-right button is pushed, a signal is transmitted to the control system. The control system may ascertain the surroundings and locate a place for turning right. Then turn-right signals are sent to a driving system to guide the vehicle to make the turn. Next, the vehicle may go straight until receiving new instructions from the user. At step 274, the user pushes a stop button. After the control system receives the stop command, it finds an available parking spot and drives the vehicle there at step 276.

FIG. 18 shows an exemplary flow diagram describing an embodiment related to stopping at a place according to the present invention. Assume that at step 278 an autonomous vehicle arrives at a place and stops there. Next, a user opens a door of the vehicle and gets off at step 280. It may be arranged that before the user closes the door, a control system of the vehicle may conduct a quick search to ascertain whether the user leaves anything in the vehicle accidently at step 282. For instance, a user may leave a wallet or a pair of sunglasses on a seat. The search may start when the control system detects that a door is open and the user has gotten off the vehicle and the search may be concluded and search result generated before the door is closed. When a user hasn't closed the door, the user may still pay certain attention to the vehicle. Thus, it may be more effective to send alert signals before a user shuts the door when something happens. So both searching and alerting actions may be performed quickly and in time. When there are multiple occupants, a search may get started after the last occupant leaves a vehicle.

A search for objects left behind may be done using cameras installed in a vehicle. Several cameras may be employed to take pictures from different angles and cover the interior space of the vehicle. Vehicle seat and floor areas may be taken as the main targets. Two groups of pictures may be taken to record the scenes before a user enters the vehicle and after the user leaves the vehicle. The control system may compare the two groups of pictures by certain algorithm and detect any difference between them. If the two groups of pictures are quite similar or the same, the control system may conclude that nothing is left by the user and the search event ends at step 284. When the control system senses a difference and determines that the difference is caused by a foreign object which the user leaves, it may emit signals to alert the user at step 286, when the door is still open. Alerting signals may include visible signals like flashing light, audio signals, and/or audio messages to remind the user that something is left in the vehicle.

In the meantime, the control system is arranged to keep monitoring whether the object is taken from the vehicle. If the user fails to pay attention to alerting signals and messages and walks away from the vehicle, the control system may contact Service Center and send it related information. Then the control system or Service Center may send the user a message including a picture of the object to explain the situation. If the user responds the message in a given time period, the control system or Service Center may schedule a place and time slot for the user to pick up the object. Meanwhile, if a second user enters the vehicle when the object is still there, the control system may notify the second user of the issue by generating an audible message and/or presenting a textual message on a display of the vehicle. In addition, the control system may ask the second user to place the object in a place of the vehicle, such as a glove compartment. The request may be presented in audible and textual messages. The control system may be arranged to send similar messages to the second user's device like smartphone too, since a user may pay close attention to incoming personal messages.

FIG. 19 shows an exemplary flow diagram describing an embodiment related to payment issues according to the present invention. Assume that at step 288 a vehicle is traveling on a road in autonomous mode. At step 290, Service Center or a control system of the vehicle checks whether a user has enough funds in an account to pay for the trip. For instance, the user may have submitted instructions to ask the vehicle to take a detour path, which may make a journey longer and cost more than originally estimated. If the user's account has enough funds for the payment, the control system navigates the vehicle to a scheduled destination autonomously at step 292. If the user's account doesn't have enough funds, the control system may show a message on a display of the vehicle possibly with an audible signal to get the attention of the user at step 294. The message may be arranged to urge the user to add funds to the account, like "Not Enough Funds in Your Account. Please Add Funds". Next, the control system may await user action to settle payment issues at step 296. If the user makes a payment in time, the control system drives the vehicle to the destination autonomously at step 292. If a payment is not received within a given time, the control system may present another message. This message is made to inform the user that the vehicle has to stop due to inadequate funds. Examples of such a message may include "Not Enough Funds in Your Account. Vehicle Will Stop Soon". Next at step 298, the control system may find a nearby parking space, calculate a trajectory, and drive the vehicle there. If there is a certain amount of funds remaining in the account, the user may select a new destination which may be covered by the balance. The selection may be made before or after the vehicle is stopped. Once the control system gets the new destination and approves it, it may calculate a route and navigate the vehicle to the new place along the route autonomously.

As there is a method to deal with inadequate payment, it may be designed that after a user submits instructions en route, the control system may take and implement the instructions immediately without making sure that the user has paid enough or the user's account has enough funds to support it. In other words, after the control system receives a user request for a maneuver, the system is arranged to calculate a route segment and implement the request first. In the meantime or a short while later, the control system may start checking whether the user has paid enough to cover the additional cost, has an account with enough funds, or uses a credit card for payment. The method provides for a user an option to change a route or take a detour without delay, which makes it easy and convenient to navigate an autonomous vehicle. It is noted that before a vehicle sets off at a pickup location, any payment issue has to be resolved. If the control system can't clear a payment matter, the system may not start a journey.

Figure 20:
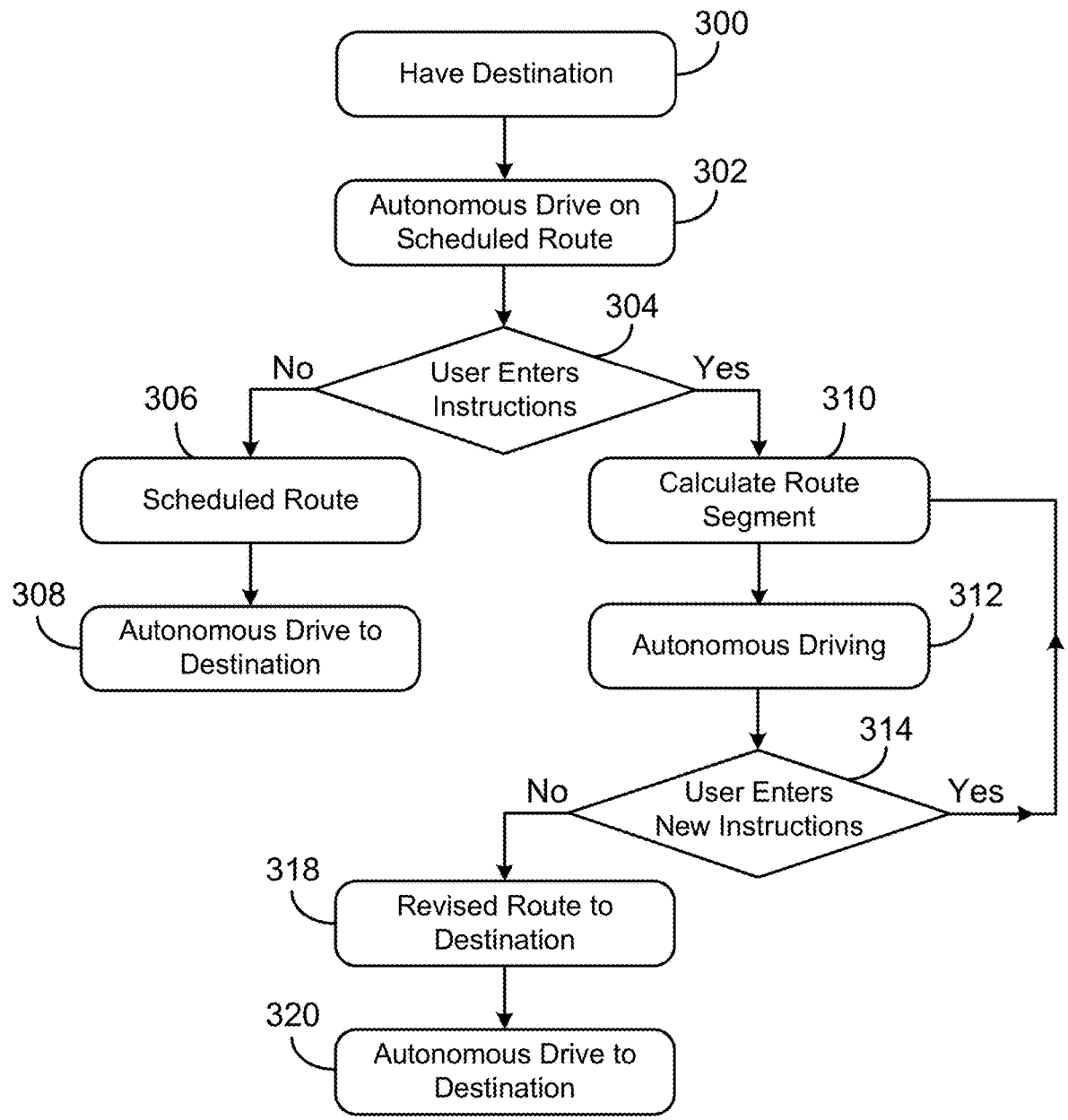

FIG. 20 shows an exemplary flow diagram describing an embodiment according to the present invention. Assume that an autonomous vehicle obtains destination info at step 300 and is traveling autonomously along a scheduled route at step 302. As a user may submit instructions anytime, a control system of the vehicle monitors user input at step 304. If the control system doesn't receive any user instruction, the scheduled route remains unchanged at step 306. The control system guides the vehicle to a destination autonomously at step 308. If the control system receives user instructions, such as a request to make a turn, the system calculates a route segment to implement the order at step 310. Next the system drives the vehicle autonomously on the route segment at step 312. Meanwhile, the control system keeps monitoring whether the user enters any new instructions at step 314. If new instructions are received from the user, the control system goes through steps 310 and 312 one more time. If the user doesn't submit any input within a predetermined distance starting from a location where the latest instructions are entered, the control system calculates a revised route to go to the destination at step 318. Next, the vehicle autonomously navigates to the destination on the revised route at step 320.

Figure 21:
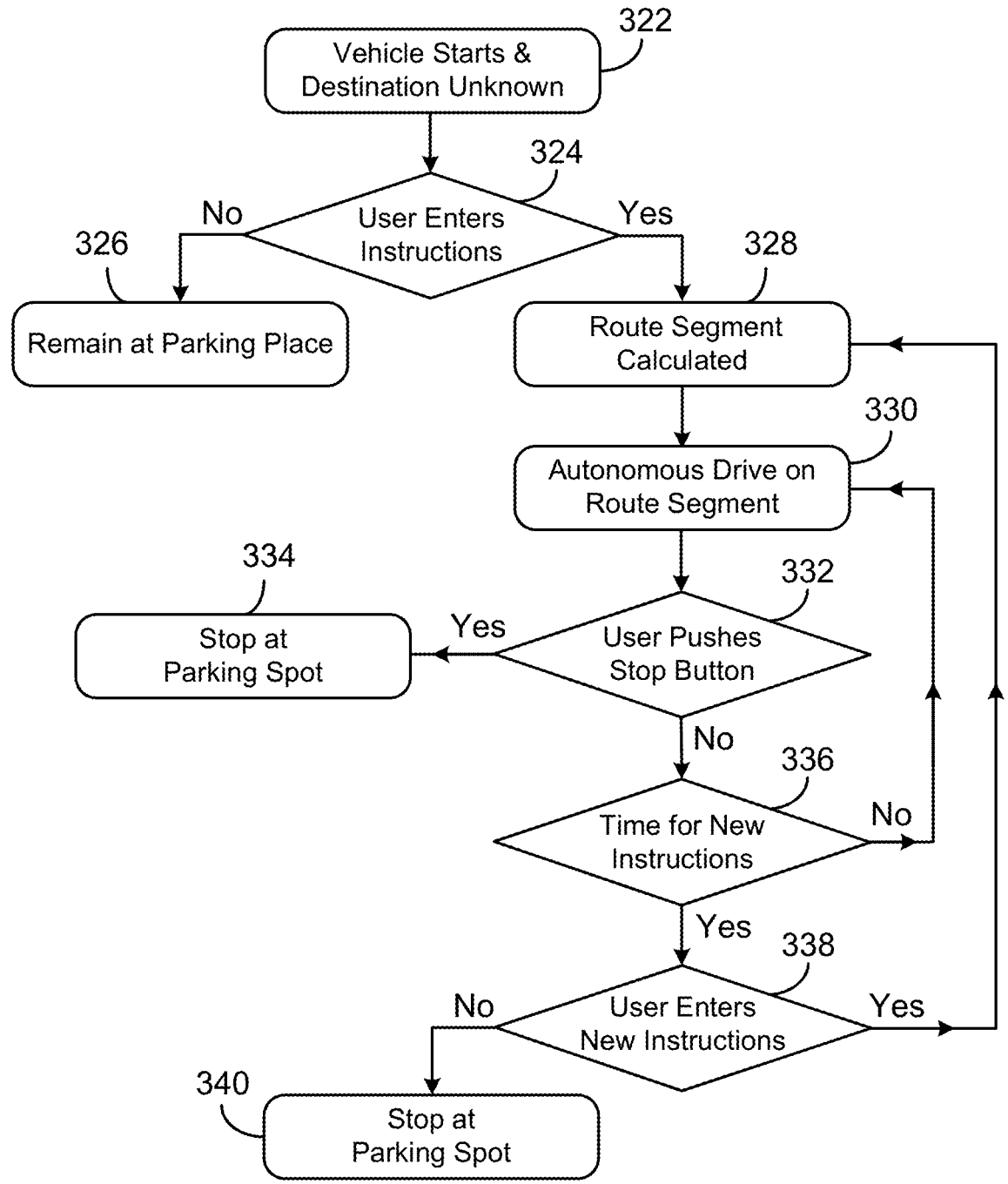

FIG. 21 shows another exemplary flow diagram describing an embodiment according to the present invention. Assume that an engine of an autonomous vehicle is started at step 322, but a control system of the vehicle hasn't obtained destination information yet. The control system is ready to take user instructions at step 324. If the user doesn't enter any input, the control system may keep the vehicle at a parking place at step 326. If the user enters instructions, the control system calculates a route segment based on the instructions and road conditions at step 328. Then the control system navigates the vehicle autonomously on the route segment at step 330. During the journey, if the control system receives a stop command at step 332, which may happen when the user pushes a stop button, the system locates a parking spot nearby after evaluating the surrounding conditions and stops the vehicle there at step 334. If the user doesn't enter a stop command, the control system continues to drive the vehicle along the route segment and at the same time checks whether it is time to receive new instructions from the user at step 336. If the user doesn't need to submit new instructions, the journey along the route segment continues. If it is time for the user to enter a new request, the control system monitors user input at step 338. Next, if the user inputs new instructions, another route segment is calculated and the control system begins a new round from step 328. If the user doesn't enter any instructions within a predetermined distance, the control system finds a parking spot and stops the vehicle there at step 340.

Figure 22:
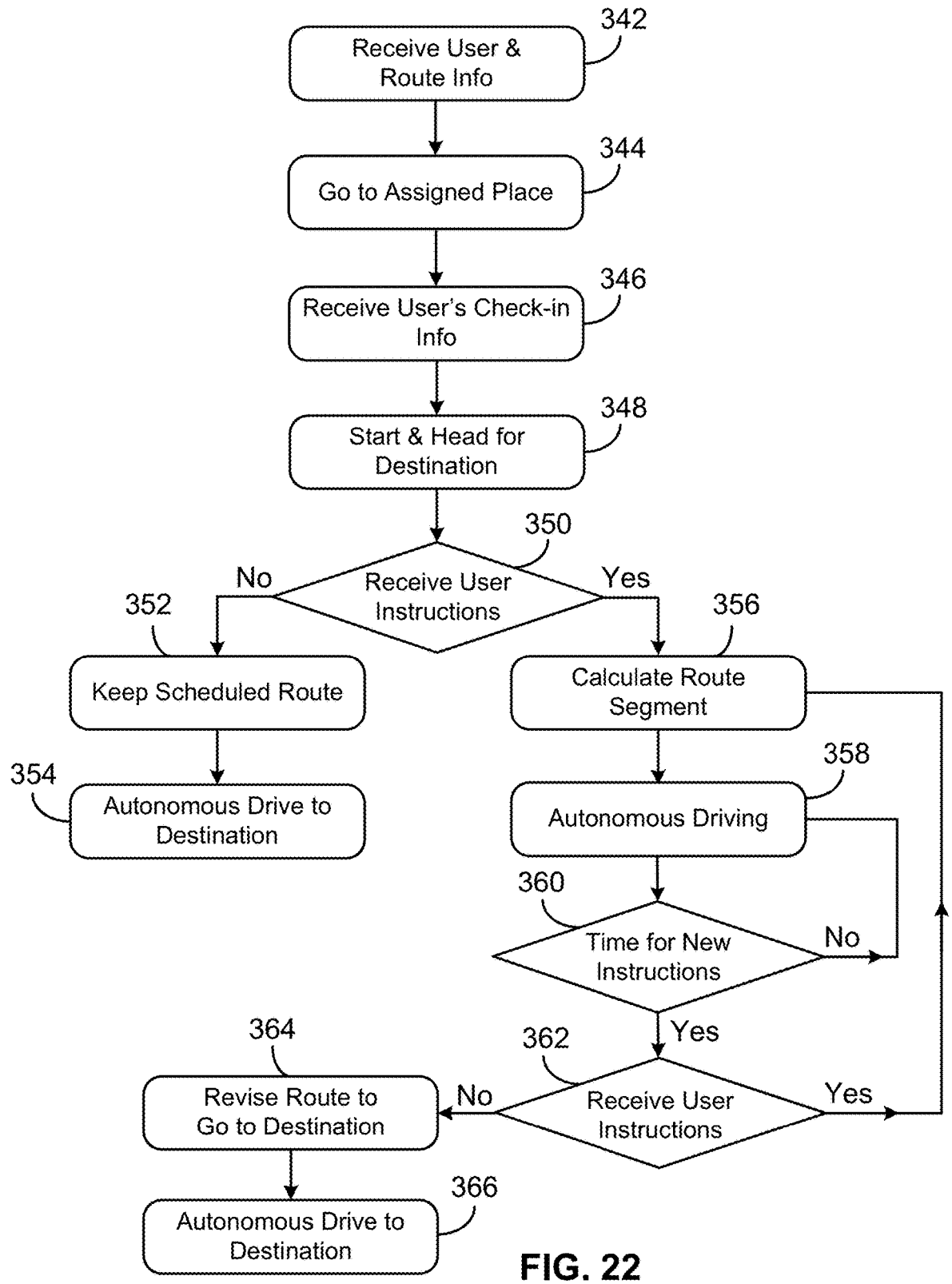

FIG. 22 shows yet another exemplary flow diagram describing an embodiment according to the present invention. Assume that an autonomous vehicle receives user info, a pickup location, a destination location, and a scheduled route from Service Center at step 342. A control system of the vehicle then navigates the vehicle to the assigned pickup location at step 344. Next, a user shows up and enters check-in info. The control system receives and verifies the check-in info at step 346. Then the control system starts the vehicle's engine and travels towards the destination at step 348. During the journey, the control system keeps monitoring whether the user enters any instructions at step 350. If the user doesn't submit any request, the control system maintains the scheduled route at step 352 and navigates the vehicle to the destination autonomously at step 354.

If the user enters navigational instructions, the control system calculates a route segment at step 356 after receiving the info. Next, the control system guides the vehicle autonomously along the route segment at step 358. Then at step 360, the control system checks whether it's time for the user to submit new instructions. If the user doesn't need to give new instructions, the vehicle continues to drive autonomously along the route segment. If it's time for the user to give new input, the control system awaits it at step 362. If the user enters instructions, a new round begins and the control system calculates a new route segment at step 356. If the user doesn't enter instructions within a given distance, the control system starts calculating a revised route to the destination at step 364. Then at step 366, the vehicle travels along the revised route autonomously.

Figure 23:
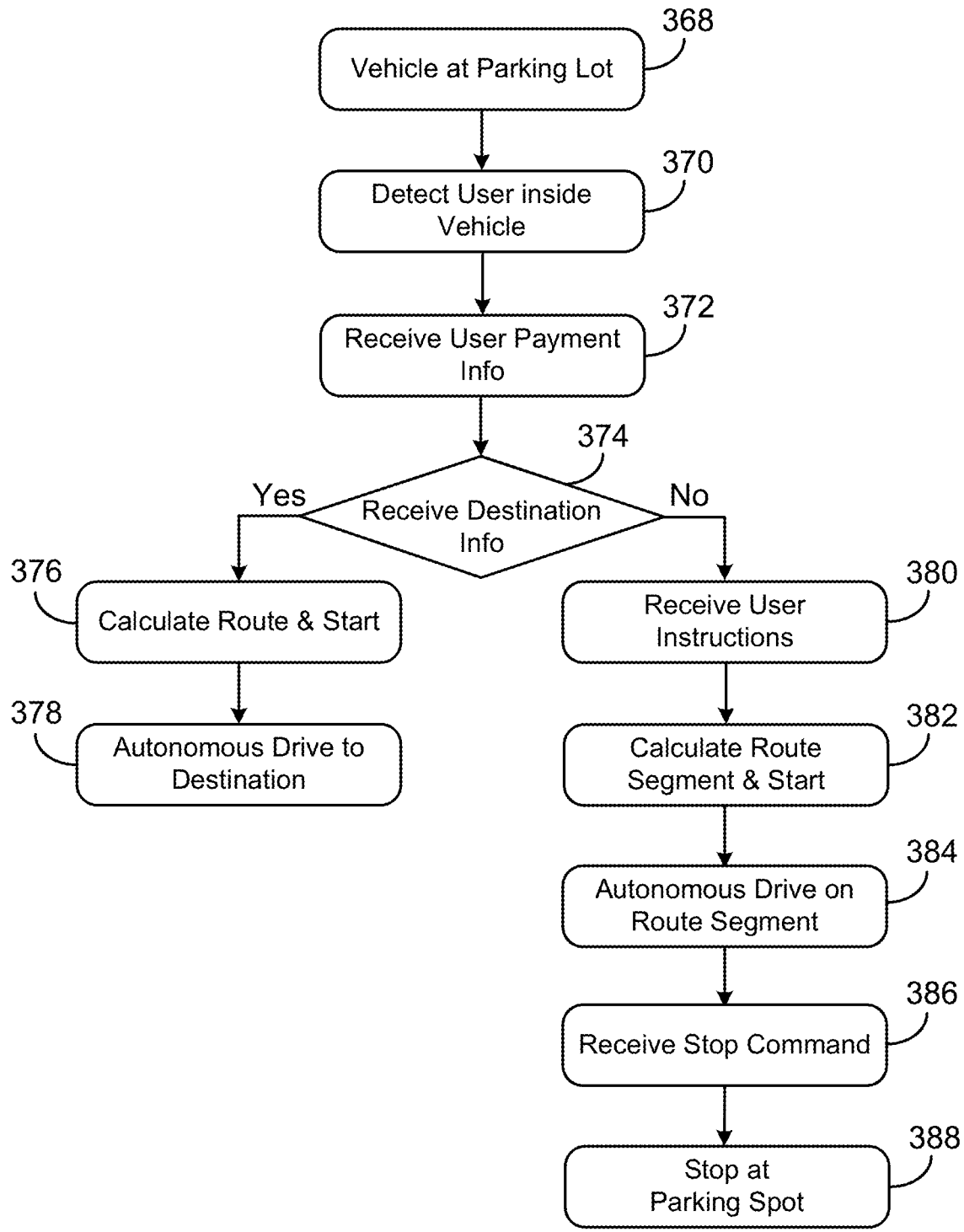

FIG. 23 shows yet another exemplary flow diagram describing an embodiment according to the present invention. Assume that an autonomous vehicle is parked at a parking lot at step 368. Then at step 370, a control system of the vehicle detects that a user enters the vehicle using various sensors. At step 372, the control system receives info that the user has made a payment to ride on the vehicle. The payment info may come from a transaction system at the vehicle or from Service Center if the payment is processed there. Next the control system checks whether destination info is received at step 374. If the control system obtains destination info, it calculates a route to a destination and starts a journey at step 376. Next at step 378, the control system navigates the vehicle to the destination autonomously along the calculated route.

If the control system doesn't receive any destination information, it may guide the vehicle to travel on route segments which may be generated separately along a time line. At step 380, the control system receives user instructions, like going forward or turn-right. At step 382, the control system calculates a route segment based on road conditions and starts the vehicle. Next, the control system navigates the vehicle along the route segment autonomously at step 384. After that, the control system receives additional instructions from the user, calculates additional route segments, and navigates the vehicle on the route segments respectively. Next at step 386, the control system receives a stop command. Consequently at step 388, the control system senses the surroundings, finds an unoccupied parking spot, calculates a trajectory, and drives the vehicle there.

FIG. 24-A shows an exemplary control panel 94 of an autonomous vehicle according to the present invention. Control panel 94 may be located beside a front seat or on a dashboard. Buttons on the panel may be physical hard buttons or virtual soft buttons on a touch screen. Like control panel 56 of FIG. 6-A, a start and stop button are configured on panel 94 for starting and stopping the vehicle. But unlike panel 56, there are five navigational buttons, instead of four. Navigational buttons 74, 76, 78, 80, and 82 are arranged to represent forward, backward, turn-left, turn-right, and U-turn commands. After a user pushes a navigational button to submit a navigational request, a signal is transmitted to a control system of the vehicle. Next, the control system may send signals to a driving system of the vehicle which may drive the vehicle to go forward, backwards, turn left, turn right, or make a U-turn. Since backing and U-turn functions are assigned to two buttons, it becomes straightforward to give reversing or U-turn instructions. It may be arranged that buttons on panels 94 and 56 may have the same functions or even the same design except the backward and U-turn representations. It is noted that the five buttons of FIG. 24-A correspond to five fundamental commands for navigation, meaning another simple, concise, and intuitive configuration for a control panel. Additionally, backward button 76 and U-turn button 82 are arranged to be separated by at least a given distance on the panel for distinction purpose and easy operation.

FIG. 24-B shows an exemplary control panel 96 of an autonomous vehicle according to the present invention. Control panel 96 may function in a similar way to panel 94, and may be located beside a front seat of the vehicle or in a dashboard area. There are a start and stop button arranged for starting and stopping the vehicle respectively. Navigational instructions may be issued via a knob 98 of a joystick. A user may shift knob 98 to five positions to submit orders to drive forward, backwards, turn left, turn right, and make a U-turn. The five positions are represented by five arrow labels 84, 86, 88, 90 and 92 respectively. Comparing FIG. 24-B with FIG. 24-A, it is seen that shifting knob 98 to five positions are equal to pushing the five navigational buttons, while one position corresponds one button with the same navigational effect. The five shifting places again present a simple, concise, and intuitive arrangement for control panel design.

Furthermore, it may be arranged that a control system of a vehicle may not take another order within a time period when a maneuver is being implemented. For instance, after the control system receives a user request for a maneuver, it calculates a route segment and sends signals to a driving system to perform the maneuver. When the maneuver is being performed, the control system may not accept another request from the user. If a user keeps pushing a navigational button, the control system is arranged to recognize the continued push as one order before a maneuver is completed. Thus only after a maneuver is implemented, the control system may take a continued button-push as the next request. The same is true for shifting a knob. A user may shift a knob to a position and then release it to submit a navigational request. After a given short time period, the knob may automatically return to the origin, the place before being shifted. If a user shifts the knob to a place and then holds the knob there so that the knob doesn't return to the origin, the holding act may be designed to be equal to pushing a navigational button continuously. Thus as just discussed, holding a knob in a place only produces one request in a time period when a maneuver is in the process of implementation. And holding a knob in a place may cause submission of the same navigational request after a previous one is fulfilled.

Since a user may change mind after submitting a request, certain rules may be made for handling such situations. It may be arranged that a control system of a vehicle determines whether to cancel a previous order after receiving another order based on the feasibility of executing the new order. For instance, after receiving instructions to do a maneuver, the control system calculates a route segment and sends signals to a driving system to navigate the vehicle accordingly. Next the control system receives another order for a different maneuver from the user. After getting the new order, the control system calculates a new route segment and then calculates the feasibility of traveling along the new route segment. If it is doable to maneuver along the new route segment, the control system may cancel the previous order and guide the vehicle along the new segment. If it is illegal, unsafe, or impossible to travel along the new segment, the control system may decline to accept the new order and notify the user that the new order is not taken.

FIG. 25 shows a graphic diagram to illustrate an embodiment according to the present invention. A road map 510 is presented on a screen 512 of an autonomous vehicle 500. Screen 512 may also serve as an interface of a control system of the vehicle. Map 510 shows two main roads, Main Street and First Avenue. There are also a parking lot 508 and two side roads, East Lane and West Lane on the map. Assume that traffic light is configured at an intersection 514, a junction of the two main roads. Vehicle 500 is traveling on Main Street towards First Avenue. When a user in vehicle 500 pushes a forward button to submit a forward request, vehicle 500 may be arranged to go straight along Main Street for a predetermined distance. The case is relatively simple. But when the user submits a turn-right or turn-left request, it may become complicated, since there are three places for turning right and two places for turning left as shown in the figure.

Assume that the user pushes a turn-right button. As seen in FIG. 25, vehicle 500 has three chances to turn right, i.e., at East Lane, an entrance of parking lot 508, and intersection 514. As aforementioned, the control system may be arranged to perform a right turn at the first intersection ahead of the vehicle. By the configuration in the figure, the control system may try to turn right onto East Lane. If it is too late to slow down for East Lane, the control system may decline the request and notify the user of the situation with a message presented on screen 512. Next, if the user pushes turn-right button again, the control system may calculate a route segment for turning right at intersection 514. It may be arranged that the entrance of parking lot 508 is not considered as a place to make a turn in the process, since it is not at an intersection.

But in real life, a user may want to turn at any allowable place. In addition, turning at the next intersection only may cause anxiety and uneasiness for some users. Thus after the control system receives a turn-right signal, three arrow-shaped icons 502, 504, and 506 with a label "Turn Here" may be configured to appear on map 510 to represent the three places where turn-right is allowable. So, after the user pushes a turn-right button, the three icons may show up on screen. The user may tap an icon to select a place to make the turn. Once an icon is tapped, the icon may become brighter or changes color, while the other two icons may be shrunk to become a smaller arrow with no label attached. For instance, icon size reduction may be around fifty percent or more. Once the control system receives a tapping signal, the system may calculate a first route segment and navigate the vehicle to make the turn. If the user changes mind before the vehicle turns right, the user may tap one of the smaller arrows, which may regain the original size in response along with appearance of a label while the icon, which is tapped previously, becomes a smaller arrow without a label. Next, the control system may process the new order, calculate a second route segment, and determine whether the second route segment is implementable. If the answer is yes, the control system may guide the vehicle along the second route segment and make the turn.

In the figure, three places are presented where turn-right is doable. The places are labeled by icons 502, 504, and 506. In order to make it easy to handle, it may be arranged that after a user submits a turn-right request, all places within a given range where turn-right is allowed may be marked by an icon on a map. The icon may look like the arrow-shaped icons of FIG. 25. A given range may be defined by Service Center and it may represent a segment of a roadway which is in front of a vehicle. An exemplary value of a given range may be of one hundred to two hundred yards, which may give a user adequate time to make a decision and submit a request. The value of a given range may also be speed dependent and it may increase when vehicle speed increases and decrease when vehicle speed decreases. Hence, after a user pushes a turn-right button, the control system may display a map on a screen and show icons at all places where a vehicle may be allowed to turn right within a given range on a roadway or along a forward direction. The user may tap an icon to select a place for making the turn.

To make it easy for submitting a turning order and then selecting a place to make a turn, navigational buttons may be configured in an interface of a control system, or navigational buttons and a map may be shown together on a screen. For instance, a screen may be arranged to have two parts. One part may show a map, while the other part may show some functional icons, messages, and a button configuration like that of FIG. 6-A or 24-A. The button configuration may be arranged to look like and work like control panel 56 or 94. So a user may have two options to enter instructions: Via a stand-alone control panel or an interface of a control system where a map and navigational buttons are presented side by side.

It is noted that the same method applies to turn-left and U-turn cases. For instance, after a user enters these navigational instructions, "Turn Here" icons may appear at some places on a map for user selection. When there is only one place for making a turn, a "Turn Here" icon may still appear to assure a user, even though there is no need to select it. Label "Turn Here" is for illustration purpose only, which may be replaced by other labels such as "Turning".

Besides pushing a button or shifting a knob to a place, a user may also say a word or sentence to issue a verbal command via a voice recognition system. Verbal commands may cover all aspects of driving maneuvers, such as when to start, where to stop, making turns, destination change, route change, where to park, etc. A voice recognition system may also be arranged to ascertain whether a user gives any verbal instructions to implement a command presented by buttons of panel 94 of FIG. 24-A. In addition, when a command is issued verbally, a user may add conditions to it and the command may become a modified command. A modified command may include a condition which specifies when, where, and/or how a command would be executed.

It may be arranged that when a user is inside a vehicle, a control system not only monitors whether a button on a panel or on a touch screen is pushed, or a knob is shifted, but also monitors whether any verbal message which may be related to driving instructions is detected. A voice recognition system may be arranged to remain in an operational mode and to receive and process verbal instructions anytime. As another option, an "Input Verbal Command" icon may be configured on a screen to help make a voice-recognition process more effective. A user may tap the icon first, which may be arranged to trigger or alert the voice recognition system. Once triggered or alerted, the voice recognition system may be arranged to get ready to receive verbal instructions. Then the user may speak to the screen to issue a command. A voice recognition sensor may be integrated with the screen or located beside it.

A vehicle's travel route may be changed easily and conveniently. As discussed in the above, a route may be calculated by a control system of a vehicle after it obtains pickup location and destination info. The route may be changed by a user anytime and multiple times before a journey and during a journey, while the destination may remain the same or be changed as well. Assume that a display with a touch screen is configured in the vehicle. The screen may serve as an interface of the control system. On the screen, the control system may be arranged to show a "Change Route" and "Confirm Route Change" icon, wherein the former is used to start a route change session and the latter to conclude a route change session. Once a user taps "Change Route" icon, a current route, i.e., a route in current use, may appear on a map. Then the control system may monitor what the user does to the route. If the user uses fingertip to tap a spot on the route, the spot may be considered as the start point where a route change begins. Then the user may use fingertip to draw a detour line along roadways on the map. Alternatively, a detour line may also be drawn from a first spot far away from the route to a second spot on the route. Still the second spot may be called the start point, since it is on the route. A detour line may comprise one or more straight lines and/or one or more curved lines depending on road features in a region. Once drawing of the detour line is finished, the user may tap "Confirm Route Change" icon on the screen to finalize the change. After that, a revised route is created which contains part of the previous route and the detour line. Additionally, a "Cancel Route Change" icon may be configured on the screen. A user may tap "Cancel Route Change" icon to abort a route change session and erase a detour line, when the user decides not to make any change.

Route revision may lead the vehicle to any place. If a detour line ends at a point on the current route, it may mean the current destination remains the same and the user wants to get back to the current route at that spot. Once the control system receives the revision info, it creates a new route including the detour line for the vehicle. If the detour line ends at a spot away from the current route, the spot may or may not be a new destination. A "Confirm New Destination" icon and "Keep Current Destination" icon may be arranged to appear on the screen together. The user may tap "Confirm New Destination" icon to make the spot as the new destination. After the control system receives user input on the new destination, it navigates the vehicle to it along the detour line autonomously. If the user taps "Keep Current Destination" icon, the control system may calculate a route segment which connects the spot, i.e., the end of the detour line, and the current destination and navigate the vehicle along the detour line and the route segment autonomously. If the detour line or part of the detour line which the user draws is prohibited or not allowed, the control system may calculate a route segment to replace it automatically and show the result on the screen. For instance, if driving on a section of the detour line is prohibited, the control system may revise it and make the vehicle drive along another road nearby.

Therefore a user may change a route or create a detour line easily and flexibly. It may be arranged that a control system verifies a start and end point of a detour line first, after the line is drawn by a user. A start point has to be on the current route or at a spot close to it. In the latter case, the control system may automatically correct the error by calculating a line which connects the spot and a point on the current route. An end point may be anywhere on a map, even at a prohibited place, such as in a pedestrian-only area, since the control system may automatically correct it and move it to a close-by spot. Once the start and end points are verified, the control system may check the detour line to ascertain whether it is legal and allowable for driving. As mentioned, certain errors may be tolerated, e.g., a detour line which a user draws may even go through a building, since the control system may revise any part of a detour line when needed. The control system may calculate driving time to achieve an optimized result, when it adds roads to correct detour line errors. After corrections are made by the control system, a revised detour line may be presented on the screen. If the user accepts the revised detour line, the user doesn't need to do anything. If the user doesn't like the revised detour line, the user may tap "Change Route" icon to start a new route change session. The user may also tap "Cancel Route Change" icon to erase the revised detour line completely.

Vehicle orientation direction at a parking lot may be predetermined. As aforementioned, a display of an autonomous vehicle may be arranged to show an enhanced map on a screen after the vehicle arrives in a destination area or is in a close distance to a destination location. A user may utilize the enhanced map to select a parking spot and the vehicle may drive there autonomously. As an enhanced map may show available parking spots in surrounding areas, it provides a method to stop a vehicle at a preferred location easily and conveniently. Furthermore, it may be arranged that after a user taps a "Parking Spot" icon and then taps to select a parking spot on an enhanced map, a rotatable vehicle-shaped graphic object may appear at the spot. The front and rear ends of the object may represent the front and rear ends of a vehicle. A user may rotate the object to change its orientation and the object's orientation may represent the orientation of a vehicle after it stops at the spot. Hence, a user may tap a parking spot on an enhanced map to select where to stop a vehicle and rotate an object at the spot to select or predetermine a direction the vehicle faces when it stops there. The option makes it simple and easy to park an autonomous vehicle at a selected location with selected orientation.

As a vehicle may be allowed to stop at a place with restricted orientation, like either facing outwards or inwards, a user may only have limited orientation choices. If a user uses fingertip to rotate a vehicle-shaped object on a map and aligns it to a prohibited direction, the object may be "bounced" and may rotate to face an allowable direction automatically as a countermeasure.

Furthermore, a rotatable vehicle-shaped graphic object may be configured on a regular map as well. Like just discussed, an object may be arranged for selecting and indicating a vehicle's orientation direction. As a regular map may only provide an approximate area for parking, exact location of a parking spot may not be determined in advance. Even though a parking spot can't be decided on a regular map, determination of vehicle orientation may still be helpful in some cases. For instance, getting the right orientation may provide convenience when there is a need to load or unload goods. Thus, a "Parking Spot" icon may be arranged for a regular-map setting too. A control system may present a rotatable vehicle-shaped graphic object at a parking place after the place is chosen by a user as a destination. For instance, the user may tap "Parking Spot" icon and then tap a parking place to select it. Next, a graphic object may appear and the user may rotate the object to choose or predetermine an allowable orientation direction, assuming that the control system or Service Center has info on orientation direction at the place. After the control system gets the input and the vehicle arrives at the parking place, the control system may calculate a trajectory, park the vehicle at a parking space, and make the vehicle oriented along the prearranged direction.

An autonomous vehicle may be used as taxi to serve the general public. The vehicle may carry certain signs like a taxi does so that a person may easily recognize it and hail it using gestures. As aforementioned, a vehicle may also carry an electronic display panel to show an identification object arranged for a reservation. The display panel may be placed on or exposed to the exterior of the vehicle, e.g., on the roof or behind the windshield of it. The display panel may be used to present a message to a person who hails the vehicle on a street.

When an autonomous vehicle drives as taxi along a road, its control system may be configured to monitor behaviors of pedestrians and people standing on the sidewalk whether or not the vehicle is vacant. The monitoring process may be performed continuously via analyzing images captured by sensors like aforementioned cameras. Images of people who are close to the curb of the road are singled out. Then the images are analyzed via certain algorithm to ascertain whether anyone gestures to hail a vehicle. Hailing gestures may include stretching out an arm, raising a hand, sticking out a hand, or other predetermined postures. If a vehicle is vacant, the control system may navigate the vehicle to a person automatically after finding a hailing signal. As the vehicle approaches the person, the control system may respond to the person's request by showing a confirmation message on a display panel. As mentioned, the display panel may be placed on or exposed to the exterior of the vehicle. The confirmation message may be like "Welcome", "Ready", "Please Get in", etc.

If a vehicle is occupied or out of service, it may display a sign showing that it is not available, like what current taxis do. But the vehicle's control system may be arranged to do more. For instance, after a control system of an occupied vehicle detects that a person is making a hailing gesture beside the curb at a place, it may measure the person's location, record a current time, and send a message to Service Center automatically. The message may contain location and time info of the person who may need a vehicle. Next, Service Center receives the message. The center may check available vehicles around the place, select a vehicle to serve the person, dispatch the selected vehicle to the place, and calculate an estimated time which reflects how long it may take for the selected vehicle to arrive at the place. Then Service Center may communicate to the occupied vehicle and send it the estimated time, say, ten minutes. Next the control system of the occupied vehicle obtains the info from the center. The system may respond to the person's request by presenting a message showing the estimated time on a display panel when the vehicle drives close to the person. The message may be like "Another Car in 10 Minutes" or simply "10 Min". It is noted that the occupied vehicle doesn't need to stop when passing by the person. As a response to the person's hailing request, the message serves as an assurance which lets the person know what would happen and may improve the hailing experience. Moreover, besides autonomous vehicles, the responding method may be used by driver-operated vehicles as well.

Currently when a user reserves a taxi, destination info is required. Destination info helps a taxi company coordinate vehicles and make appropriate arrangements. Since dispatching a vehicle to pick up a person or user only needs a pickup location and a pickup time and doesn't require a destination, it may be configured that a user may book a vehicle without disclosing where to go, which eliminates one step and makes a hailing process easier and faster. Assume that a user uses an electronic device to hail or reserve a vehicle. The device may include but not limited to a smart phone, a smart watch, a desktop computer, a notebook computer, a tablet computer, other wearable device, a virtual reality (VR) device, an augmented reality (AR) device, and the like. The device may include a processor and computer readable medium. The processor may run programs or sets of executable instructions stored in the readable medium for performing various functions and tasks like surfing on the Internet, placing phone calls, playing video or music, etc. The device may also have a touch-sensitive screen as a display and interface and a voice recognition component to receive a user's verbal command or audio input.

Referring to FIG. 26. It shows an exemplary diagram describing a simple hailing process according to the invention. Assume that a user has installed an app, for instance, a "Car App", at an electronic device, such as a smartphone 516. The app or application, as a specialized program, is designed to help a user book or hail a vehicle. After the user launches the app, an app interface appears on a touch screen 518 of phone 516. The interface has a title "1-Tap to Hail a Car". A logo "Car App" is placed at a bottom area of the screen. A button 520, as an interactive element, has a label "Hail Car". There are three small windows 522, 524, and 526 below button 520, in which a user may enter a pickup place, a pickup time, and a destination respectively.

After it is launched, the app starts communicating with Service Center and gathering location data from the phone or a service provider. Meanwhile, the app monitors whether button 520 is activated. It may be configured that a user only needs to do one action, i.e., tapping button 520, to hail a vehicle right away. The process is fast, simple, and straightforward and may be called one-tap hailing or one-action hailing. Once the app senses that button 520 is activated, a vehicle reservation process begins. The app obtains current time data and sends a message to Service Center. The message contains the user's request for reserving a vehicle, the time data, and location info of the user. After receiving the message, Service Center may check available vehicles in areas around the user's location, select a vehicle, dispatch the selected vehicle to the user, and calculate an estimated time period the user may have to wait for the vehicle to get there. Next the center may communicate with the app at phone 516, confirm the reservation, and inform the user of the estimated time period. Upon receiving the info, the app may present a short message in its interface. The message may confirm that a reservation is made and show a time period for a vehicle to come. Examples of the message may include "Confirmed! Vehicle arrives in 10 minutes". Like other reservation processes discussed, Service Center may also send the user a vehicle identification object, such as a picture, a symbol, or a code for recognizing an assigned vehicle. Thus, it is seen that without a need of submitting destination info, a user may hail a vehicle by one tap in an app interface after the interface appears. Like the phrase "Hail a Car without Input" depicted in FIG. 26, a user doesn't need to enter any information to hail a vehicle. After button 520 is tapped, a hailing process starts and the button may change color to show that it is activated. In the meantime, a button (Not shown in the figure for brevity reason) with a label like "Cancel Hailing" may show up in the interface. The button may be used to cancel a hailing request.

In above discussions on one-tap hailing, it is assumed that a user needs a vehicle at a current location immediately. So it may be arranged that empty windows 522 and 524 mean a user selects a current location and a current time for a hailing request respectively. In other words, after the user taps button 520, the car app may convert empty windows into predetermined pickup location info and pickup time info, even though the user doesn't input the info manually. On the other hand, in case a user wants a pickup at another place or at a later time, the user may enter info in window 522 or 524 to make a change. The user may also submit an address in window 526 to give destination information. Button 520 may be configured to hail or reserve a vehicle for all occasions. After sensing that button 520 is tapped, the app may check contents in the three windows. If it is detected that windows 522 and 524 are empty, the app may use a user's current location and a current time as pickup info. If it is detected that window 522, 524, or 526 contains certain information, the app may use the information as a condition in a hailing process. For instance, upon activation of button 520, the app may check status of the windows. Any contents which are found in the windows may be sent to Service Center as additional requests in a hailing process, such as where or when to pick up a user or where a destination is.

Therefore, a user may hail a vehicle with one tap on prearranged conditions, or hail a vehicle with more steps on specified conditions. From another angle, the interface at phone 516 provides a user with two options to hail a vehicle. A user may choose an option which requires one action only or choose another option which needs multiple actions.

As discussed, if a user does one-action or one-tap vehicle hailing, the user's current location is considered as a pickup location. When a user's location is accessible to vehicles, Service Center may approve the location for pickup. However, if a user's location is inaccessible to vehicles, such as a spot on a platform of a subway station, inside a store, or inside a high-rise building, Service Center may deny it and as a result, the center may automatically select a nearby place for pickup. During the process, it is assumed that a user may accept any nearby place as a pickup location and allow or authorize Service Center to select one if a submitted pickup place is inaccessible or inconvenient. The authorization enables a user to do a quick hailing request, especially when the user's current location is used for pickup, since the user doesn't need to worry about an exact pickup place.

After Service Center receives a hailing request from a user, it ascertains the pickup location to check whether it is accessible to vehicles. If the location is accessible, it is confirmed as a pickup location. If the location is inaccessible to vehicles, Service Center may search surrounding areas and choose a nearby place for pickup. For instance, after a user submits a one-tap hailing request inside a store, a spot inside the store is considered as pickup location. Once Service Center discovers that the pickup location is inside a store, the center may replace it by a spot at a parking lot in front the store. The center then sends the new pickup location info to the user. The user may get the new pickup location info via the car app or a separate confirmation message sent from Service Center. In the app interface, a map may be presented and the new pickup spot may appear on the map after the confirmation info is received. The new pickup spot is away from the user's current location since the user's current location doesn't allow vehicle access. So, a user may submit a place as pickup location even though the user knows the place isn't suitable for pickup. In addition, a "Change Pickup Location" button (Not shown in the figure) may be arranged beside the map. A user may tap the button and then tap a spot on the map to make it a new pickup location. The user may enter an address in a window configured for location change as well.

It is noted that Service Center may receive two types of pickup location info. The info may be an address or name of a place if a user enters it in window 522 of FIG. 26. The info may also be a set of location measurement data when a user's current location is used as pickup info. As discussed, when a user's current location is accessible to vehicles, it may be confirmed as a pickup location; Otherwise, Service Center may select a nearby place for pickup. Since there may be several nearby places which are suitable for pickup, Service Center may select one of them and provide it to a user. Alternatively, the center may also ascertain surrounding areas of the user, find and select multiple pickup locations, send the location info to the user, and then wait for response from the user. The user may review these pickup places and then choose one based on his or her preference. For instance, an app interface may show several pickup spots on a map after a confirmation message is received. A user may tap one spot to select it for pickup. The app then transmits the selection info to Service Center which in turn passes the info to a selected vehicle. If the app doesn't get any response from the user within a given time period after receiving a confirmation message, a spot chosen by the center may serve for pickup use.

After a user performs a one-tap hailing process at a location inaccessible to vehicles, Service Center may take the request and propose another location for pickup. Since it takes time for the user to walk to the proposed place, Service Center may calculate a time period, such as five to ten minutes, and inform the user of it. If the user fails to arrive at the pickup place within the time period, the reservation may expire or become invalid. If a user can't make it, the user may use the car app to schedule another pickup time. Such a method applies to scenarios when a vehicle may be ready within a short time at a pickup location. For instance, after Service Center receives a one-tap hailing request, it may check whether the user's current location is accessible or qualified for pickup and how long it may take for a selected vehicle to get there. Assume that the user's location is not qualified. Then Service Center may choose a nearby place for pickup. If Service Center gets info that a vehicle is already available at the pickup location, the center may calculate a time limit, say, ten minutes, and include the time limit in a confirmation message. The vehicle reservation remains valid only within the time limit. If the user doesn't arrive at the location or get in the vehicle within the time limit, the reservation may expire and the vehicle may be assigned to another user. It is noted that the one-tap hailing method applies to not only autonomous vehicles but also other vehicles which are operated by a driver.

CONCLUSION, RAMIFICATIONS, AND SCOPE

Thus it can be seen that systems and methods are introduced to improve autonomous driving and vehicle hailing.

The improved systems and methods have the following main features and advantages:

(1). A user may navigate an autonomous vehicle conveniently, intuitively, and without safety concerns;
(2). A user may push a button and/or shift a knob to give a navigational command;
(3) Rules are arranged to navigate an autonomous vehicle after the vehicle performs a requested maneuver;
(4) A vehicle is configured to show a message to a user who hails the vehicle with a gesture; and
(5) A vehicle may be hailed or reserved in a one-tap process via an app without destination info.

Although the description above contains many specificities, these should not be construed as limiting the scope of the invention but as merely providing illustrations of some of the presently preferred embodiments. Numerous modifications will be obvious to those skilled in the art.

Ramifications:

As a vehicle reservation process may be administered by Service Center, the exemplary flow diagram depicted in FIG. 2 may also be illustrated from another angle. For instance, a server at Service Center may receive a reservation request from a user via certain app, the center's website, or a phone call. Next, the user is asked to submit a pickup location and destination info. After the server receives pickup and destination info, it calculates a route and an estimate on the cost. The server presents cost info to the user and asks the user to select a payment method. The user may make a payment during the reservation process or do it later. After the payment process is completed, the server presents check-in options for the user to choose from. The options may include NFC, QR code, user ID, and simple code methods. The user may select one or more methods for the purpose of convenience. After receiving the user's choice of check-in methods, the server may send the user a confirmation message regarding the reservation via email or short message.

A user inside a vehicle may also submit a request using finger or hand gestures, assuming that a gesture detection sensor is turned on. The gesture detection sensor may employ a camera which takes pictures and videos of gestures. The pictures and videos may be analyzed by certain algorithm to recognize user instructions or predetermined gesture commands.

Check-in methods may also include facial recognition and other suitable schemes such as fingerprint verification. For instance, a user may select facial recognition as a check-in method so that the user doesn't need to prepare anything when riding an autonomous vehicle. After a reservation is completed, Service Center may assign a vehicle to the user and transmit to the vehicle the user's facial data. Later on, the vehicle may take pictures of the user and conduct facial recognition. The user may check in the vehicle once his or her identity is confirmed.

In a parking lot environment, it may be arranged that after a user pushes a turn-left or turn-right button, a control system of a vehicle may make the vehicle take a turn anywhere as long as it is legal, safe, and doable. For instance, the control system may create a trajectory and the vehicle may follow the trajectory and turn onto any path or unoccupied paved area except a marked parking space. It is noted that a user may navigate a vehicle to an unspecified parking space by pushing a stop button or to a user-specified parking space via using "Parking Spot" icon and enhanced map.

Assume that a user gets in an autonomous vehicle at a parking lot. After selecting a payment method and settling payment issues, the user pushes a start button to start an engine of the vehicle. Assume that the user hasn't provided destination info and as a result, a control system of the vehicle starts monitoring whether the user enters any input to set forth for a journey. Next, without worrying about collisions or other accidents, the user may push navigational buttons multiple times to navigate the vehicle out of the parking lot.

As another scenario, assume that after starting the engine, the user pushes navigational buttons a few times and the vehicle is still in the parking lot. If the user stops giving further orders for a given short time after a maneuver is performed, say five to ten seconds, the control system may take it over, calculate a route segment, and navigate the vehicle out of the parking lot autonomously. If the user doesn't like to navigate the vehicle at the parking lot, a one-action scheme may be taken. For instance, it may be arranged that the user only needs to do one thing after starting the engine, i.e., pushing any one of the navigational buttons. After the control system receives a signal of button activation, it may generate a route segment and navigate the vehicle out of the parking lot autonomously. The user may intervene by pushing a navigational button anytime along the route segment.

Again assume that a vehicle is started at a parking lot and ready to set out but a control system of the vehicle hasn't gotten destination info yet. Once the control system receives a signal which indicates that a navigational button is pushed, the system may calculate a first route segment, send signals to a driving system of the vehicle, and make the driving system drive the vehicle out of a parking space and then out of the parking lot autonomously. Meanwhile, the control system calculates a second route segment. After the vehicle leaves the exit of the parking lot, the control system may be arranged to drive it along the second route segment. For instance, if it is an intersection and the vehicle is allowed to go straight, turn left, and turn right after exiting the parking lot, the control system may guide the vehicle to go straight through the intersection. If the vehicle is allowed to turn left and turn right only, the control system may guide the vehicle to turn right. If there is only one path out there, the path may be taken. Next, the control system may drive the vehicle along the same roadway or to go straight through one or more intersections on the second route segment. During the journey, the user may enter instructions anytime to navigate the vehicle or enter destination info. In case the user doesn't enter any instructions, the control system may stop the vehicle after it travels the second route segment.

In some cases, when a user is travelling in an autonomous vehicle, the user may want to change destination for some reasons. As discussed when explaining embodiments of FIG. 4, a "Select Destination" icon may be arranged on a screen of a display or in an interface of a control system. A user may tap the icon and then enter new destination info by keying in an address, tapping a spot on a map, or scribbling to create an area on a map. After the control system receives a new destination, it may calculate a new route and guide the vehicle to the place along the new route. A user may change destination anytime, whether a vehicle is traveling on a road or has already arrived at a destination.

A control system of an autonomous vehicle may be arranged to determine the speed of the vehicle autonomously. The system may choose a speed based on road conditions and speed of surrounding vehicles. In certain situations, the control system may be allowed to make a choice within a speed range. In such cases, the control system may be arranged to select a value in the middle of the range. Since some users may prefer a higher or lower speed, it may be designed that vehicle speed is adjustable within certain limits. For instance, a display of the vehicle may show an "Adjust Speed" icon and current speed. After a user taps the icon, two graphic objects like two arrows may appear on screen under a title "Change Speed". The user may tap an arrow to increase the speed or the other to reduce the speed within an allowed range. Adjusted speed may be presented on the display. After receiving speed adjustment signals, the control system may send commands to a driving system which may change the vehicle speed accordingly.

In FIG. 6-A, labels "Forward", "Backward/U-turn", "Left", and "Right" may be placed beside navigational buttons 34, 36, 38, and 40 respectively. The labels may help a user identify the buttons quickly and easily. Similarly in FIG. 6-B, labels "Forward", "Backward/U-turn", "Left", and "Right" may be placed beside arrow labels 44, 46, 48, and 50 respectively. Similar labels may be arranged for buttons and arrow labels in FIGS. 24-A and 24-B as well. For instance, labels "Backward" and "U-turn" may be arranged beside buttons 76 and 82 respectively and arrow labels 86 and 92 respectively.

When an autonomous vehicle is traveling on freeway, tapping a forward button or shifting a knob to a forward position may cause the vehicle to go straight along the freeway for a given distance, such as a few miles, starting from the location where the request is made. Service Center may determine the value of the given distance, where a few miles may mean two to five miles. But navigational instructions may have a different meaning when commands other than forward are entered. For instance, it may be arranged that when a control system of the vehicle receives a turn-right signal, which may happen after a user pushes a turn-right button, the system may calculate a route segment to guide the vehicle to leave the freeway at the next exit. If the next exit is a freeway-to-freeway interchange, the control system may calculate a route segment to navigate the vehicle to "turn right" at the interchange. Along the route segment, the vehicle may take a ramp which leads to another freeway going to the direction towards the right. In the meantime, the control system may present the route segment on a display to inform the user of the upcoming maneuver. The control system may also present a message to explain the maneuver and an icon which the user may use to cancel the turn-right action. The icon may have a label like "Cancel Turn-Right Command". After making a "turn right" maneuver to drive onto another freeway and in the absence of user instructions, the vehicle may be arranged to go straight along it for a given distance, such as a few miles, starting from the interchange. If a "turn right" request causes the vehicle to leave the freeway and drive onto a regular road, the vehicle may follow rules as if it just makes a right turn at a regular intersection per user request, wherein the rules may exclude entering any freeway autonomously. In general, it may be arranged that after implementing a user request, a vehicle may not drive to a ramp leading to a freeway when it navigates autonomously on a road within a predetermined distance.

Assume the vehicle is still running on a freeway. When a turn-left button is pushed by the user, the control system may be arranged to generate a route segment that guides the vehicle to make a "left turn" at the next freeway-to-freeway interchange when the interchange is within a given range, say two to three miles. When the interchange is out of the given range and the user pushes a turn-left button, the control system may post a message on the screen and ask the user to confirm the request. A "left turn" act may be implemented using a ramp which takes the vehicle to another freeway going to the left direction. Again after that and in the absence of user instructions, the vehicle may go straight along the freeway for a given distance, such as a few miles, starting from the interchange. When a U-turn button is pushed, the control system may be arranged to calculate a route segment and guide the vehicle to exit the freeway at the next exit and then re-enter the freeway going to the opposite direction through a freeway entrance. Next in the absence of user instructions, the vehicle may drive on the freeway for a given distance, such as a few miles, starting from the entrance. As reversing is prohibited on freeway, the control system may decline any backing request.

Alternatively, a user may also use "Change Route" and "Confirm Route Change" icons, as aforementioned, to change a scheduled or current route along a freeway, especially when a user wants to go from one freeway to another at a complex multi-level interchange. For instance, a user may use fingertip to tap "Change Route" icon on a screen, draw a detour line through or around an interchange on a map, and then tap "Confirm Route Change" icon. The detour line may connect a spot on a freeway which the vehicle is travelling along and another spot on another freeway. And the detour line may cross one or more freeways on the map, which may be ignored by the control system. Next, the control system may calculate a feasible route segment to replace the detour line automatically. After that, the control system may navigate the vehicle to drive through the interchange along the route segment and onto the selected freeway. In the absence of user instructions, the vehicle may drive on the selected freeway for a given distance, such as a few miles, starting from the interchange.

If the control system doesn't receive any further instruction from a user after making a maneuver and travelling a given distance on a freeway, the system may calculate a route and navigate the vehicle to a prearranged destination or leave the freeway at the next exit and stop the vehicle at a parking place nearby if there is no destination information.

For a VR or AR device, a virtual display or a display with a small size may be used. When a user opens an app to hail a vehicle at a VR or AR device, the device may show an interface similar to the one in FIG. 26. A user still has two hailing options, a one-action process with prearranged conditions or a multi-action process with other conditions.

Again, a user may enter info in the windows individually or leave them empty. As aforementioned, an empty window means a prearranged condition. Since finger tapping in a VR or AR interface is not available, the act may be implemented by verbal command or prearranged hand gestures. In a verbal process, a user may say "Open car app" to start an app. If one-action is preferred, the user may say a short sentence to complete a hailing request. The short sentence may contain one or a few words only, such as "Hailing", "Booking", "Booking now", "Hail a car", etc. If a pickup place other than a current location is desired or a later pickup time is decided, the user may say several sentences to input the info. The verbal process may be used with other electronic devices when the devices have a voice recognition system.

Lastly, methods discussed in the above may apply to semi-autonomous vehicle as well. The term "semi-autonomous vehicle", as used herein, may mean a vehicle which has two types of mode or two modes: Autonomous mode and manual mode. The two modes may be switched from one to the other anytime. When road conditions are suitable for autonomous driving, a user may turn on autonomous mode. Once the user determines it is risky for autonomous driving, the user may terminate autonomous mode and starts driving it manually. When the vehicle is in autonomous mode, aforementioned methods may apply, assuming that a semi-autonomous vehicle has a control panel like panel 56, 58, 94, or 96 or the same or similar panel configuration on a touch screen of a display, wherein a user may use the panel or the configuration on the touch screen to submit fundamental navigational commands.

Therefore the scope of the invention should be determined by the appended claims and their legal equivalents, rather than by the examples given.

The invention claimed is:

1. A computer implemented method for vehicle hailing or reservation via an electronic device, the electronic device having a display, the method comprising:
   1) presenting content items in an interface of the display after a user opens a hailing and reservation program at the electronic device;
   2) communicating with a service facility and obtaining location information about the electronic device corresponding to a current location of the electronic device, the location information including location data obtained by the electronic device or via a service;
   3) presenting an interactive element for vehicle hailing in the interface;
   4) receiving destination information after the user submits the destination information via the interface;
   5) sending the service facility a request message for vehicle hailing in response to activation of the interactive element by the user; and
   6) after it is determined that the current location is not suitable for passenger pickup, informing the user of a pickup location that is away from the current location, and informing the user of a time period, wherein the time period is arranged for the user to go to the pickup location.

2. The method according to claim 1 further including presenting a first message in the interface, the first message stating a one-action vehicle-hailing process.

3. The method according to claim 1 further including presenting cost information to the user.

4. The method according to claim 1 further including sending to the service facility the request message for vehicle hailing in response to activation of the interactive element when information about destination is not submitted by the user.

5. The method according to claim 1, wherein the sending step is performed after a voice command for vehicle hailing is received via voice recognition.

6. The method according to claim 1, wherein corresponding vehicle reservation expires after the time period elapses.

7. The method according to claim 1, wherein the time period is calculated based on the current location and the pickup location.

8. A computer implemented method for vehicle hailing or reservation via an electronic device, the electronic device having a display, the method comprising:
   1) presenting content items of a hailing and reservation program in an interface of the display;
   2) communicating with a service facility and obtaining location data of the electronic device corresponding to a current location of the electronic device, the location data obtained by the electronic device or via a service;
   3) providing at least one option for the user to submit destination information;
   4) receiving destination information after the user submits the destination information via the hailing and reservation program;
   5) sending the service facility a request message for vehicle hailing in response to activation of an interactive element configured in the interface for vehicle hailing; and
   6) after it is determined that the current location is not suitable for passenger pickup, informing the user of a pickup location that is away from the current location, and informing the user of a time period, wherein the time period is arranged for the user to go to the pickup location.

9. The method according to claim 8 further including presenting a first message in the interface, the first message stating a one-action vehicle-hailing process.

10. The method according to claim 8 further including presenting cost information to the user.

11. The method according to claim 8 further including sending to the service facility the request message for vehicle hailing in response to activation of the interactive element when information about destination is not submitted by the user.

12. The method according to claim 8, wherein the sending step is performed after a voice command for vehicle hailing is received through voice recognition.

13. The method according to claim 8, wherein corresponding vehicle reservation expires after the time period elapses.

14. The method according to claim 8, wherein the time period is calculated based on the current location and the pickup location.

15. A computer implemented method for vehicle hailing or reservation via an electronic device, the electronic device having a display, the method comprising:
   1) presenting content of a hailing and reservation program in an interface of the display;
   2) communicating with a service facility and obtaining location data of a current location of the electronic device, the location data obtained by the electronic device or via a service;
   3) presenting a plurality of pickup places in the interface after it is determined that the current location is not suitable for passenger pickup;

4) considering one of the plurality of pickup places as a pickup location after the one of the plurality of pickup places is selected by the user;

5) sending the service facility a request message for vehicle hailing in response to activation of an interactive element configured in the interface for vehicle hailing; and 6) informing the user of a time period, wherein the time period is arranged for the user to go to the pickup location.

16. The method according to claim 15 further including presenting cost information to the user.

17. The method according to claim 15 further including sending destination information to the service facility after the user submits the destination information through the hailing and reservation program.

18. The method according to claim 15, wherein the sending step is performed after a voice command for vehicle hailing is received through voice recognition.

19. The method according to claim 15, wherein corresponding vehicle reservation expires after the time period elapses.

20. The method according to claim 15, wherein the time period is calculated based on the current location and the pickup location.

* * * * *